(12) United States Patent
Anno et al.

(10) Patent No.: US 11,802,954 B2
(45) Date of Patent: Oct. 31, 2023

(54) RADAR DEVICE

(71) Applicant: DENSO CORPORATION, Kariya (JP)

(72) Inventors: Yuki Anno, Kariya (JP); Sungwoo Cha, Kariya (JP)

(73) Assignee: DENSO CORPORATION, Kariya (JP)

( * ) Notice: Subject to any disclaimer, the term of this patent is extended or adjusted under 35 U.S.C. 154(b) by 342 days.

(21) Appl. No.: 17/126,624

(22) Filed: Dec. 18, 2020

(65) Prior Publication Data

US 2021/0247509 A1    Aug. 12, 2021

(30) Foreign Application Priority Data

Dec. 20, 2019  (JP) ................................. 2019-230139
Dec. 17, 2020  (JP) ................................. 2020-209626

(51) Int. Cl.
*G01S 13/72*     (2006.01)
*G01S 13/931*    (2020.01)
*G01S 13/58*     (2006.01)
*G01S 13/42*     (2006.01)

(52) U.S. Cl.
CPC .......... *G01S 13/726* (2013.01); *G01S 13/426* (2013.01); *G01S 13/584* (2013.01); *G01S 13/931* (2013.01); *G01S 2013/932* (2020.01); *G01S 2013/93271* (2020.01)

(58) Field of Classification Search
CPC .... G01S 13/726; G01S 13/426; G01S 13/584; G01S 13/931; G01S 2013/932; G01S 2013/93271
USPC ...................................................... 342/109
See application file for complete search history.

(56) References Cited

U.S. PATENT DOCUMENTS

| | | | | |
|---|---|---|---|---|
| 3,803,605 A | * | 4/1974 | Case | G01S 13/933 342/30 |
| 5,302,956 A | * | 4/1994 | Asbury | G01S 13/325 342/70 |
| 5,465,079 A | * | 11/1995 | Bouchard | G01S 13/325 340/576 |
| 9,128,174 B2 | * | 9/2015 | Kurono | G01S 7/2925 |

(Continued)

FOREIGN PATENT DOCUMENTS

| JP | H10-123246 A | | 5/1998 | |
|---|---|---|---|---|
| JP | 3538100 B2 | * | 6/2004 | G01S 13/72 |

(Continued)

*Primary Examiner* — Nuzhat Pervin
(74) *Attorney, Agent, or Firm* — POSZ LAW GROUP, PLC

(57) ABSTRACT

A radar device including a transmission antenna; a reception antenna; and a controller detecting target information about a target by transmitting a transmission wave from the transmission antenna in multiple transmission/reception modes and by receiving a reception wave by the reception antenna. The multiple transmission/reception modes include: a scanning mode performing beam scanning within a detection angle range; a provisional tracking mode irradiating the transmission wave from the transmission antenna to each of the targets detected in the scanning mode for provisionally detecting target information; and a main tracking mode decisively detecting the target information of each of the targets by irradiating the transmission wave to the target using a transmission wave irradiation time that is set based on the target information provisionally detected in the provisional tracking mode.

21 Claims, 13 Drawing Sheets

(56) References Cited

U.S. PATENT DOCUMENTS

| | | | | |
|---|---|---|---|---|
| 9,354,299 | B2* | 5/2016 | Ishimori | G01S 13/345 |
| 9,869,761 | B2* | 1/2018 | Yoshimura | G01S 13/345 |
| 9,971,022 | B2* | 5/2018 | Nishio | G01S 13/42 |
| 10,036,805 | B2* | 7/2018 | Lee | G01S 13/32 |
| 10,551,488 | B2* | 2/2020 | Cornic | G01S 13/584 |
| 2003/0156055 | A1* | 8/2003 | Tamatsu | G01S 13/584 |
| | | | | 342/107 |
| 2004/0022417 | A1* | 2/2004 | Nishigaki | G06V 20/58 |
| | | | | 382/104 |
| 2005/0140541 | A1* | 6/2005 | Yamagami | G01S 13/426 |
| | | | | 342/107 |
| 2012/0116663 | A1* | 5/2012 | Tsunekawa | B60T 7/22 |
| | | | | 701/300 |
| 2012/0223855 | A1* | 9/2012 | Kurono | G01S 7/2925 |
| | | | | 342/146 |
| 2013/0311077 | A1* | 11/2013 | Ichida | G08G 1/16 |
| | | | | 701/300 |
| 2014/0214271 | A1* | 7/2014 | Choi | B60W 30/095 |
| | | | | 701/36 |
| 2016/0073309 | A1* | 3/2016 | Iwanaga | H04W 48/14 |
| | | | | 370/331 |
| 2017/0325158 | A1* | 11/2017 | Phogat | H04W 48/16 |
| 2017/0336495 | A1* | 11/2017 | Davis | G01S 7/35 |
| 2017/0357270 | A1* | 12/2017 | Russell | G06V 20/58 |
| 2017/0363731 | A1* | 12/2017 | Bordes | G01S 7/354 |
| 2018/0045818 | A1* | 2/2018 | Majumdar | G01S 17/42 |
| 2018/0090008 | A1* | 3/2018 | Ikenouchi | G08G 1/166 |
| 2019/0044485 | A1* | 2/2019 | Rao | H03B 5/1212 |
| 2019/0391250 | A1* | 12/2019 | Cohen | G01S 13/87 |
| 2020/0353919 | A1* | 11/2020 | Kawabata | G01S 15/93 |

FOREIGN PATENT DOCUMENTS

| | | | | |
|---|---|---|---|---|
| JP | 2010237129 A | * | 10/2010 | G01S 7/02 |
| JP | 5304393 B2 | * | 10/2013 | G01S 7/02 |
| JP | 2015227782 A | * | 12/2015 | G01S 13/00 |

* cited by examiner

FIG. 10
| TTC CATEGORY | TRACKING PRIORITY | |
|---|---|---|
| | NECESSITY OF DECISIVE TRACKING | PRIORITY VALUE |
| TTC < 0 | NOT REQUIRED | – |
| 0 ≤ TTC < T_ref | REQUIRED | 1 |
| T_ref ≤ TTC < T_ref + Ta | REQUIRED | 2 |
| T_ref + Ta ≤ TTC < T_ref + 2 x Ta | REQUIRED | 3 |
| ... | REQUIRED | ... |
| T_ref + (n-2) x Ta ≤ TTC < T_ref + (n-1) x Ta | REQUIRED | N |
| ... | REQUIRED | ... |
| T_max ≤ TTC | NOT REQUIRED | – |
FIG. 11
EMBODIMENT
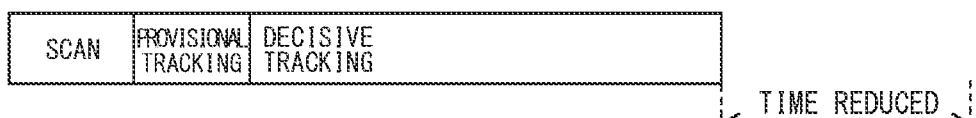
COMPARATIVE EXAMPLE

RADAR DEVICE

CROSS REFERENCE TO RELATED APPLICATION

The present application is based on and claims the benefit of priority of Japanese Patent Application No. 2019-230139, filed on Dec. 20, 2019, and Japanese Patent Application No. 2020-209626, filed on Dec. 17, 2020, the disclosure of which are incorporated herein by reference.

TECHNICAL FIELD

The present disclosure generally relates to a radar device.

BACKGROUND INFORMATION

A radar device mounted on a vehicle detects a target by performing beam scanning that irradiates a transmission wave sequentially in a detection angle range while changing the beam direction.

SUMMARY

It is an object of the present disclosure, in this specification, to provide a radar device that enables a reduction of the time required to detect the target information of respective targets even when a plurality of targets are detected within a detection angle range.

It should be noted that the reference numerals in the parentheses described above merely show one example of a correspondence relationship with a specific configuration in an embodiment to be described later in order to facilitate understanding, and are not intended to limit the technical scope in any way.

BRIEF DESCRIPTION OF THE DRAWINGS

Objects, features, and advantages of the present disclosure will become more apparent from the following detailed description made with reference to the accompanying drawings, in which:

FIG. 10 is a diagram of a priority setting table;

FIG. 11 is an explanatory diagram for explaining effects of providing the provisional tracking mode;

DETAILED DESCRIPTION

Figure 1:
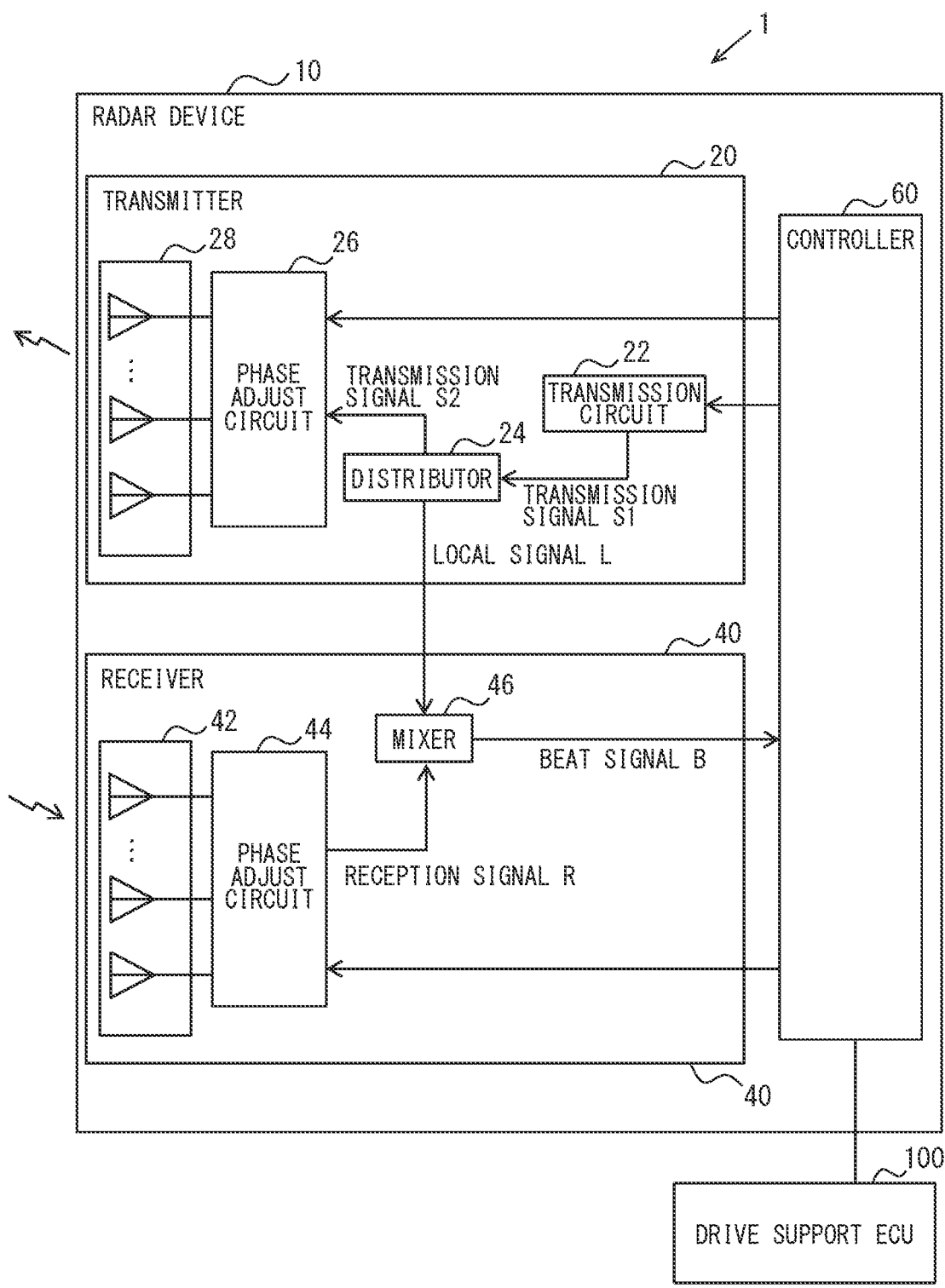
FIG. 1 is a diagram of a hardware configuration of a radar device according to an embodiment.

Hereinafter, with reference to the drawings illustrating a plurality of embodiments of the radar device, a radar device 10 which is a constituent element of an in-vehicle system 1 is described. In the description of a plurality of embodiments, the same or corresponding parts may be denoted by the same or similar reference numerals, and redundant description may be omitted. In the description of each embodiment, when only a part of the configuration is described, other parts of the configuration can be applied by referring to the other, preceding embodiments.

First Embodiment

The first embodiment is described as follows. The configuration of the radar device 10 is described first, and then the method of detecting the distance and the relative speed in the FCM (Fast Chirp Modulation) method is described. Then, a plurality of transmission/reception modes and a target detection process flow are described in order.

<Overall Configuration>

As shown in FIG. 1, the in-vehicle system 1 includes the radar device 10 and a drive support ECU 100. The in-vehicle system 1 is mounted on a vehicle such as a four-wheeled vehicle, a two-wheeled vehicle and the like.

The radar device 10 transmits a transmission wave, receives a transmission wave reflected by an object as a reception wave, and detects a distance to a target, which is an object that reflects the transmission wave, a relative speed to the target, and an azimuth/direction thereof as target information. The radar device 10 outputs the detected target information. The target information output from the radar device 10 is input to the drive support ECU 100 via an in-vehicle network such as CAN (Control Area Network (registered trademark)) or Ethernet (registered trademark). Alternatively, the radar device 10 may output the target information to the drive support ECU 100 via a dedicated communication line between the radar device 10 and the drive support ECU 100. The radar device 10 of the present embodiment is an FCM type millimeter wave radar. The radar device 10 is mounted at a predetermined position of the vehicle, i.e., at a front end part of the vehicle, for example.

The drive support ECU 100 acquires target information of each target output by the radar device 10. The drive support ECU 100 performs various processes for supporting the driving of the vehicle by the driver based on the acquired target information of each target. ECU is an abbreviation for Electronic Control Unit.

Examples of process related to drive support include a warning process, a collision avoidance process and the like. The warning process is a process of warning the driver of the possibility of collision with the target based on the target information of each target. The collision avoidance process is a process of performing vehicle control for avoiding a collision with the target by controlling a brake system, a steering system, and the like based on the target information of each target.

The configuration of the radar device 10 is described in the following. As shown in FIG. 1, the radar device 10 includes a transmitter 20, a receiver 40, and a controller 60.

The transmitter 20 includes a transmission circuit 22, a distributor 24, a phase adjust circuit 26, and a transmission antenna 28.

Figure 2:
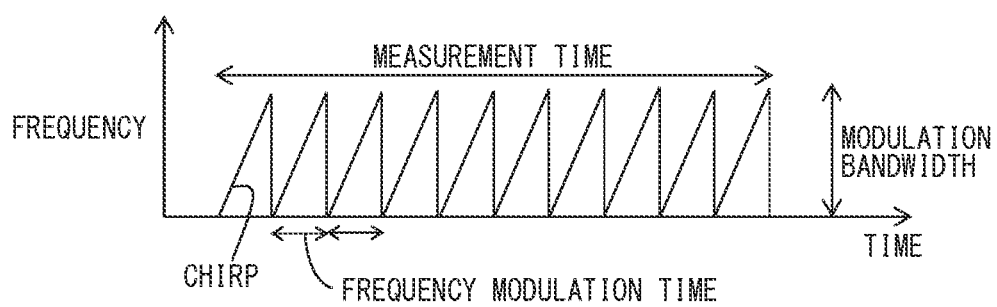
FIG. 2 is an explanatory diagram of a transmission signal in an FCM (Fast Chirp Modulation) method.

The transmission circuit 22 generates a transmission signal S1 to be supplied to the distributor 24 in a transmission wave signal pattern as shown in FIG. 2 in accordance with a transmission signal generation instruction input from the controller 60. The transmission circuit 22 generates, as an FCM transmission signal, the transmission signal S1 in which a plurality of chirps whose frequencies continuously increase for a frequency modulation time as shown in FIG. 2. The transmission signal S1 shows a saw-tooth waveform composed of a plurality of chirps, with the frequency on the vertical axis and the time on the horizontal axis. The frequency of each chirp of the transmission signal S1 may also be continuously reduced. The transmission circuit 22 outputs the generated transmission signal S1 to the distributor 24.

Returning and resuming the explanation for FIG. 1. The distributor 24 is a circuit that divides the transmission signal S1 input from the transmission circuit 22 and outputs a local signal L to be supplied to a mixer 46 of the receiver 40 and a transmission signal S2 to be supplied to the transmission antenna 28, and outputs the circuit. The transmission signal S1 output from the transmission circuit 22 and the transmission signal S2 output from the distributor 24 have the same transmission wave signal pattern defined by a modulation bandwidth, a frequency modulation time, and an observation time (also known as a measurement time). In the following description, the transmission signal S1 and the transmission signal S2 may both be referred to as a transmission signal S without distinction from each other (because S2 is formed by dividing/distributing S1, such that S1 and S2 have the same properties). The local signal L output from the distributor 24 also has the same transmission wave signal pattern as the transmission signal S2.

The phase adjust circuit 26 combines with the transmission antenna 28 to constitutes a transmission phased array antenna. The phase adjust circuit 26 includes a set of phase shifters, one for each antenna element that constitutes the transmission antenna 28. A beam direction instruction for instructing the beam direction (directivity) of the transmission phased array antenna is input to the phase adjust circuit 26 from the controller 60.

The phase adjust circuit 26 adjusts a phase shift amount of the transmission signal S2 using a phase shifter and supplies the adjusted phase shift amount to each antenna element so that the transmission wave having the beam direction (instructed by the beam direction instruction) is irradiated from the transmission antenna 28. By adjusting the amount of phase shift, the beam direction of the transmission phased array antenna is adjusted to an arbitrary direction instructed by the controller 60.

The transmission antenna 28 is an array antenna including a plurality of antenna elements. Each of the antenna elements irradiates a respective electromagnetic wave based on the transmission signal S2 supplied via the corresponding phase shifter of the phase adjust circuit 26. As a result, the transmission antenna 28 irradiates the surroundings of the vehicle with the transmission wave having the beam direction instructed by the controller 60.

The reception antenna 42 is an array antenna including an additional plurality of antenna elements. Each of the receiving antenna elements receives a reflected transmission wave (that is, a reflected wave) reflected by the target as a reception wave. A reception signal of the reception wave received by each antenna element is input to a phase adjust circuit 44.

The phase adjust circuit 44 constitutes a reception phased array antenna together with the reception antenna 42. The phase adjust circuit 44 includes a set of additional phase shifters (or reception phase shifters) respectively connected to each of the antenna elements forming the reception antenna 42. A reception signal is input to each phase shifter from the corresponding antenna element of the reception antenna 42. A directivity instruction is input from the controller 60 to the phase adjust circuit 44.

The phase adjust circuit 44 adjusts the amount of phase shift of the reception signal by each phase shifter so that the directivity of the reception phased array antenna is in a direction instructed by the directivity instruction. Here, the directivity (i.e., direction) of the reception phased array antenna instructed by the directivity instruction from the controller 60 is the same as the beam direction of the transmission wave of the transmission phased array antenna instructed by the beam direction instruction. Therefore, the phase adjust circuit 44 adjusts the amount of phase shift so that the directivity (i.e., direction) of the reception phased array antenna is the same as the beam direction of the transmission phased array antenna. The phase adjust circuit 44 superimposes the reception signals whose phase shift amounts are adjusted, and outputs a superimposed signal as a reception signal R to the mixer 46.

The mixer 46 is a circuit for (i) mixing the reception signal R from the phase adjust circuit 44 and the local signal L from the distributor 24 of the transmitter 20, (ii) and generating a beat signal B representing a difference between the reception signal R and the local signal L. The mixer 46 A/D-converts (converts from analogue to digital) the beat signal B and sends a converted beat signal to the controller 60.

The controller 60 is a control circuit including a CPU, a ROM, a RAM, and a microcomputer/microcontroller having a coprocessor that may perform FFT (Fast Fourier transform) and the like.

As described above, the controller 60 inputs the transmission signal generation instruction to the transmission circuit 22 and causes the transmission antenna 28 to irradiate a transmission wave having a predetermined waveform to the surroundings of the vehicle. The controller 60 causes the transmission signal generation instruction to include the instruction (description) of a waveform and an irradiation time of the transmission wave. For example, the controller 60 inputs a transmission signal generation instruction instructing (describing) a waveform of the FCM method as shown in FIG. 2 to the transmission circuit 22. Specifically, the controller 60 causes the transmission signal generation instruction to include the frequency modulation time, the modulation bandwidth, and the observation time. As a result, a transmission wave having the frequency modulation time, the modulation bandwidth, and the observation time (also known as the measurement time) specified by the transmission signal generation instruction is irradiated from the transmission antenna 28.

Further, when the transmission wave having a specific beam direction is irradiated from the transmission phased array antenna, the controller 60 matches the directivity (i.e., direction) of the reception phased array antenna with the specific beam direction to receive the reception wave. More specifically, the controller 60, when inputting a beam direction instruction instructing a specific beam direction to the phase adjust circuit 26 of the transmitter 20, inputs a directivity instruction instructing a directivity (i.e., direction) that matches the specific beam direction to the phase adjust circuit 44 of the receiver 40.

The controller 60 detects a distance to the target and a relative speed of the target by analyzing the beat signal B input from the mixer 46 using FFT process or the like when transmitting the transmission wave and receiving the reception wave.

<Explanation of Detection of Target Information by FCM Method>

Here, a method of detecting a distance to the target and a relative speed with the target in the FCM method is described.

In the FCM method, a beat signal B is generated from a transmission signal S (specifically, a local signal L) and a reception signal R, and then FFT process is performed twice on the beat signal B, for a detection of the distance and the relative speed of the target.

Figure 4:
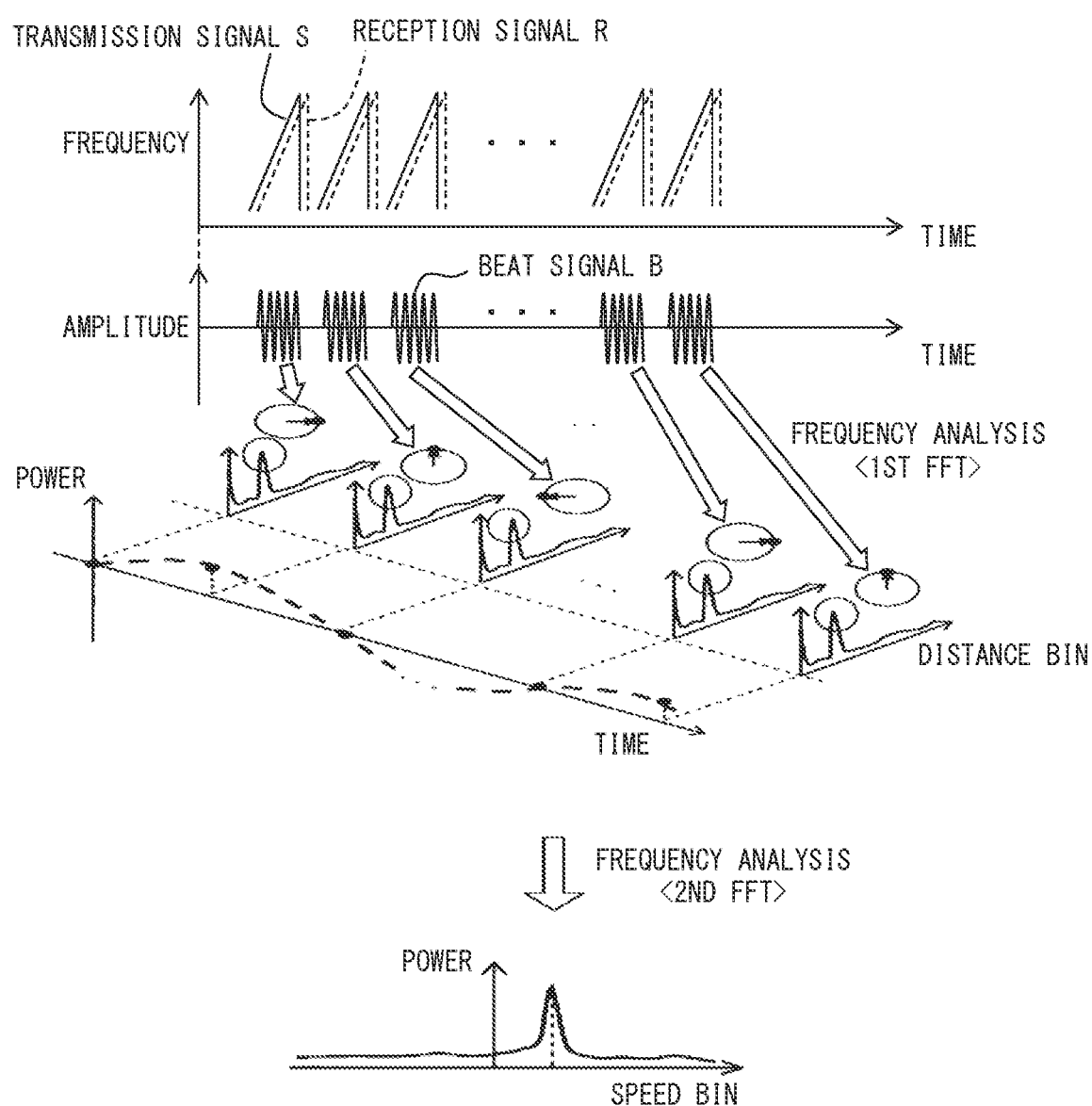
FIG. 4 is an explanatory diagram of detection of distance and relative speed in the FCM method.

More specifically, as shown in FIG. 4, the beat signal B is FFT-processed for each chirp. As a result, a frequency spectrum showing a peak at the position of a frequency corresponding to the distance of the target is obtained for each chirp. The distance to the target can be obtained by detecting in which frequency BIN (also referred to as a distance BIN: BIN is an interval between samples—interval of two samples of frequency or two samples of distance) a peak frequency is located. That is, a maximum detection distance of the FCM type radar that obtains the distance to the target depends on the modulation bandwidth of the transmission signal S. Specifically, the smaller the modulation bandwidth of the transmission signal S is, the larger the maximum detection distance can be. Since the beat signal is FFT-processed for each chirp, from the beat signal B corresponding to N chirps, N frequency spectra corresponding to each of these chirps can be obtained.

When the relative speed with respect to the target is not zero, though the frequency spectra corresponding to the respective chirps show peaks in the same distance BIN, the phases are different among the chirps. The phase difference between the chirps is caused by the change in the distance between the radar device 10 and the target. By utilizing such difference, the FCM method detects the relative speed with respect to the target. Specifically, as the second FFT process, the FFT process is performed on a waveform in which the phases in the distance BINs obtained by the first FFT process for a plurality of chirps are arranged in time series. As a result, a spectrum having a peak at a position corresponding to the relative speed with the target is obtained. By detecting in which frequency BIN (also referred to as speed BIN) a peak frequency of the spectrum is located, the relative speed with respect to the target is detected. The azimuth/direction of the target can be detected based on the beam direction.

Figure 5:
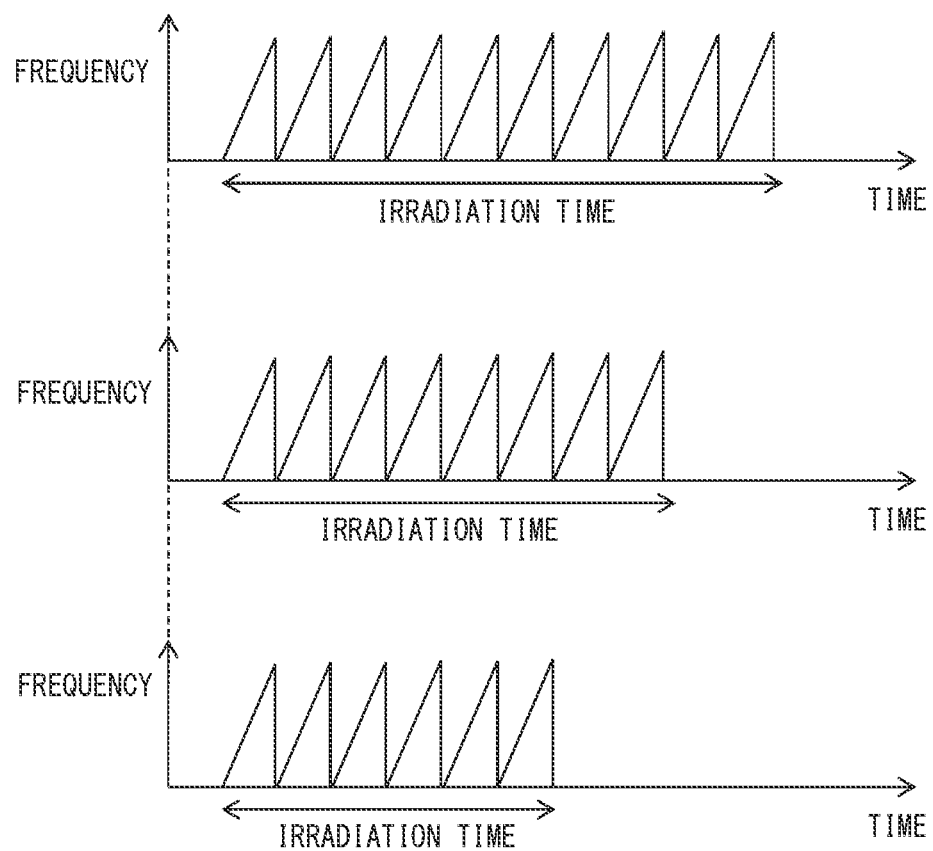
FIG. 5 is an explanatory diagram for explaining a relationship between a transmission wave irradiation time and relative speed detection accuracy.

In the FCM method, the relative speed is detected as described above, and therefore, if the irradiation time (also referred to as the observation time) is increased, the detection accuracy of the relative speed with respect to the target can be improved. For example, among the three transmission signals S shown in FIG. 5, a transmission signal S shown in a top row has the highest relative speed detection accuracy. A transmission signal S shown in a middle row has the second highest relative speed detection accuracy. A transmission signal S shown in the lower part has the lowest relative speed detection accuracy.

<Explanation of Transmission/Reception Modes>

The radar device 10 of the present embodiment irradiates a transmission wave from the transmission antenna 28 and receives a reception wave by the reception antenna 42 in three transmission/reception modes including a scanning mode, a provisional tracking mode, and a main tracking mode. Hereinafter, each of the scanning mode, the provisional tracking mode, and the main tracking mode is described in order.

Figure 3:
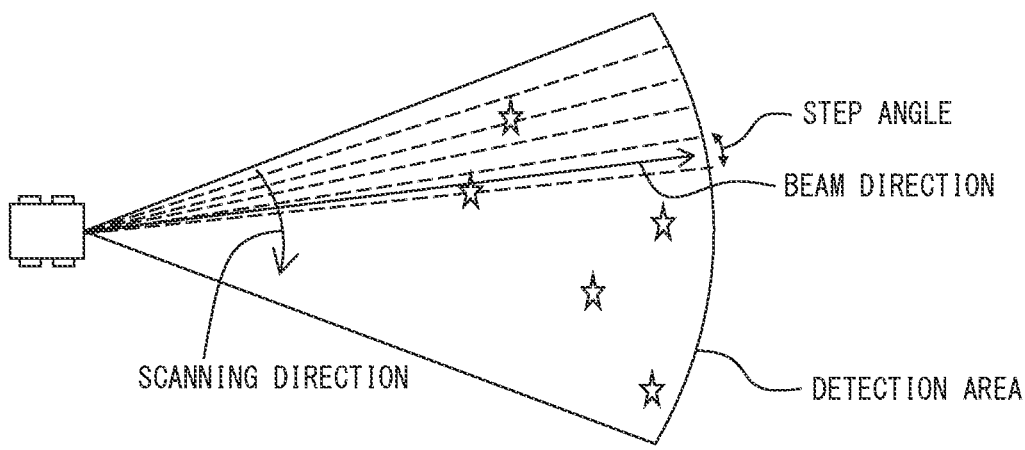
FIG. 3 is an explanatory diagram of beam scanning.

The scanning mode is a mode for beam scanning the detection angle range. Specifically, as shown in FIG. 3, the transmission wave is sequentially irradiated from the transmission antenna 28 within the detection angle range while changing the beam direction. As a result, it is detected whether or not a target exists in a detection area determined by the detection angle range and the maximum detection distance, and when a target exists, the azimuth/direction and the distance of the target are detected.

Figure 6:
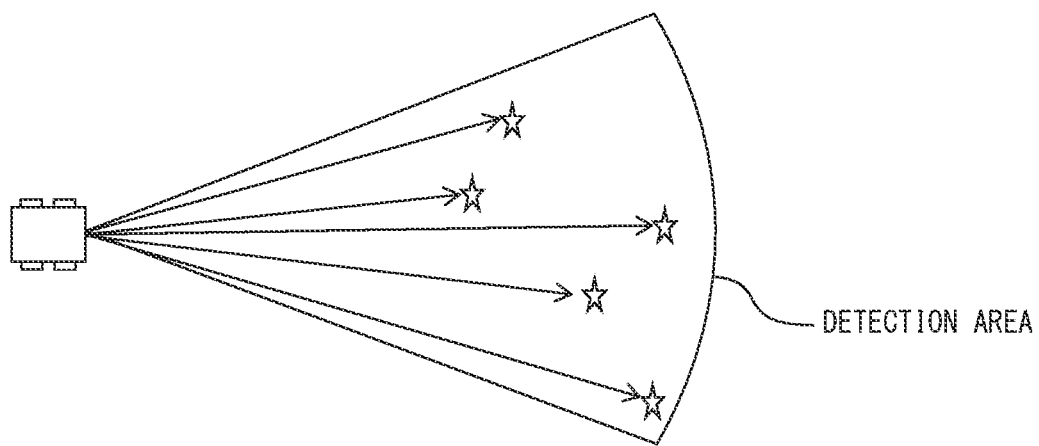
FIG. 6 is an explanatory diagram for explaining a provisional tracking mode.

In FIG. 6, the provisional tracking mode is a mode provided between the scanning mode and the main tracking mode in order to reduce the time required for the main tracking mode described later. In the provisional tracking mode, as shown in FIG. 6, for each of the targets detected in the scanning mode, the transmission waves are irradiated from the transmission antenna 28 whose beam direction is aimed at each of the respective targets. Thereby, for each target, the relative speed with respect to the target and the distance to the target are provisionally detected. In other words, in the provisional tracking mode, the transmission wave is transmitted so that the relative speed with respect to the target and the distance to the target can be detected. Even in the tracking mode, the relative speed to the target and the distance to the target can be detected. However, the transmission time of the transmission wave in the provisional tracking mode is set to a transmission time during which the tracking priority described below can be given, and is shorter than the transmission time in the main tracking mode.

In the provisional tracking mode, the target(s) to be detected in the main tracking mode is/are selected from the targets detected in the scanning mode based on the provisionally detected relative speed and distance, and then the tracking priority in the main tracking mode is given to the respective targets. Various methods can be adopted as a method for selecting a detection target in the main tracking mode and as a method for giving a tracking priority. For example, there is a method to be described later that uses an index that indicates a degree of collision risk with a target, which is calculated based on the relative speed and distance with respect to the provisionally detected target.

Figure 7:
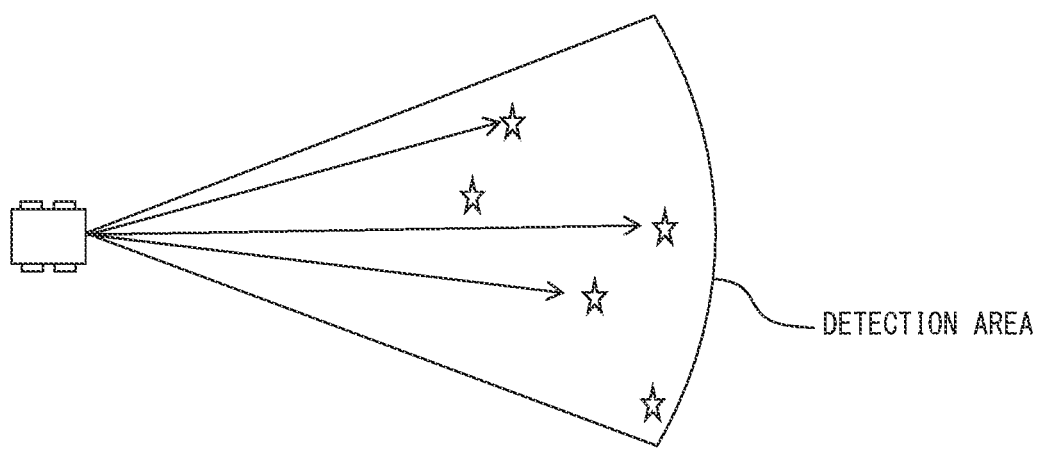
FIG. 7 is an explanatory diagram of a main tracking mode.

In FIG. 7, the main tracking mode is a mode for detecting the relative speed of the target with higher accuracy than the provisional tracking mode. Specifically, in the main tracking mode, the relative speed of the target is detected with higher accuracy than in the provisional tracking mode by irradiating each target with a transmission wave for a longer irradiation time than in the provisional tracking mode. The transmission wave is irradiated with a longer irradiation time for a target having a higher tracking priority in the main tracking mode. As a result, the relative speed of each target is detected with higher accuracy than in the provisional tracking mode, and the relative speed is detected with higher accuracy as higher the tracking priority of the target becomes.

For example, in an example of the main tracking mode of FIG. 7, of the five targets existing in the detection area, the three targets determined to require the decisive tracking in the main tracking mode have longer irradiation time of the transmission wave directed thereto. Note that two provisional targets that were tracked in the provisional tracking mode in FIG. 6, are not tracked in the main tracking mode of FIG. 7. Specifically, the second target from the top, and the bottom target are not tracked in the main tracking mode.

When the relative speed and the distance to the target are detected in the main tracking mode, the relative speed and the distance are output to the in-vehicle network together with the azimuth/direction of the target detected in the scanning mode. Based on the outputted target information, the drive support ECU 100 performs various processes such as a warning process and a collision avoidance process.

In the present embodiment, the target detection process having the scanning mode, the provisional tracking mode, and the main tracking mode described above is repeatedly performed to sequentially detect the target information of the target existing around the vehicle. The details of the target detection process are described in the following.

<Explanation of Target Detection Process (First Half)>

The target detection process is performed by the CPU of the controller 60 executing a program stored in a non-transitory storage medium such as a ROM. The target detection process starts, for example, when an ignition (IG) switch of the vehicle is turned ON, and ends when the IG switch of the vehicle is turned OFF. Hereinafter, the details of the target detection process are described with reference to the flowchart in FIG. 8.

When the target detection process is started, the controller 60 performs beam scanning (in the scanning mode) in a predetermined detection angle range in S10. Specifically, the controller 60 causes the transmission antenna 28 to irradiate the transmission waves sequentially within the predetermined detection angle range while changing the beam direction by each step angle.

For example, as shown in FIG. 3 for the scanning mode, beam scanning is performed in a scanning direction from one radius to the other of two radii forming/defining a fan-shaped detection area. As a result, the controller 60 detects whether a target exists in the detection area, and also detects: a direction of the detected target with respect to the vehicle, and the distance to the vehicle.

In S20, the controller 60 determines whether or not one or more targets are detected by the beam scanning in S10. In other words, is at least one target detected by the scanning mode? When the target is not detected by beam scanning, the process returns to S10, and the detection angle range is beam scanned again. If one or more targets are detected by the beam scanning, the process proceeds to S30. S10 and S20 constitute the above-mentioned scanning mode. Targets detected during the scanning mode become provisional targets during the provisional tracking mode.

In S30, the controller 60 provisionally tracks the target (the provisional target or provisional targets) detected by the beam scanning in S10. Specifically, as shown in FIG. 6, the controller 60 transmits the transmission wave whose beam direction is directed sequentially to each of the targets detected by the beam scanning for the provisional tracking irradiation time and from the transmission antenna 28. The controller 60, for example, irradiates the transmission wave to each of the targets, for example, sequentially for the ones in an ascending order of the relative angle from one of the radii defining edges of the detection area (see FIG. 3), from the transmission antenna 28 respectively for the provisional tracking irradiation time. Thereby, the controller 60 provisionally detects the relative speed and the distance for each target detected by the beam scanning (for each provisional target). It is to be noted that, when irradiating the transmission waves to the targets detected by the beam scanning, it is configured to irradiate the plural targets simultaneously with the transmission waves whose beam directions are the azimuths/directions of these targets.

The provisional tracking irradiation time is set in advance so as to be shorter than a main tracking irradiation time of the transmission wave irradiated for each target in the decisive tracking of S70 described later. In other words, it can be said that the provisional tracking irradiation time is set such that the relative speed detection accuracy in the provisional tracking in S30 becomes lower than the relative speed detection accuracy in the decisive tracking (main tracking mode) in S70.

In S40, the controller 60 performs a tracking priority setting process of assigning a tracking priority for each target based on the relative speed and the distance that are provisionally detected in S30. The tracking priority given to each target includes the necessity of decisive tracking indicating whether or not a target is considered as an object of tracking in the decisive tracking of S70. Various methods can be adopted as a method for determining the necessity of the decisive tracking. In the example described later, the necessity of the decisive tracking is determined based on an index that quantifies whether there is a risk of collision with the vehicle.

The tracking priority indicating that the decisive tracking is required further has a priority value indicating the priority level for detecting the target information in the decisive tracking. Various methods can be adopted as a method for giving a priority value. In an example described later, the priority value is assigned using an index that is quantified based on the target information provisionally detected in S30 and that indicates the size of the risk of collision with the vehicle.

<Explanation of Tracking Priority Setting Process>

Here, a specific example of the tracking priority setting process is described with reference to FIGS. 9 and 10.

Figure 9:
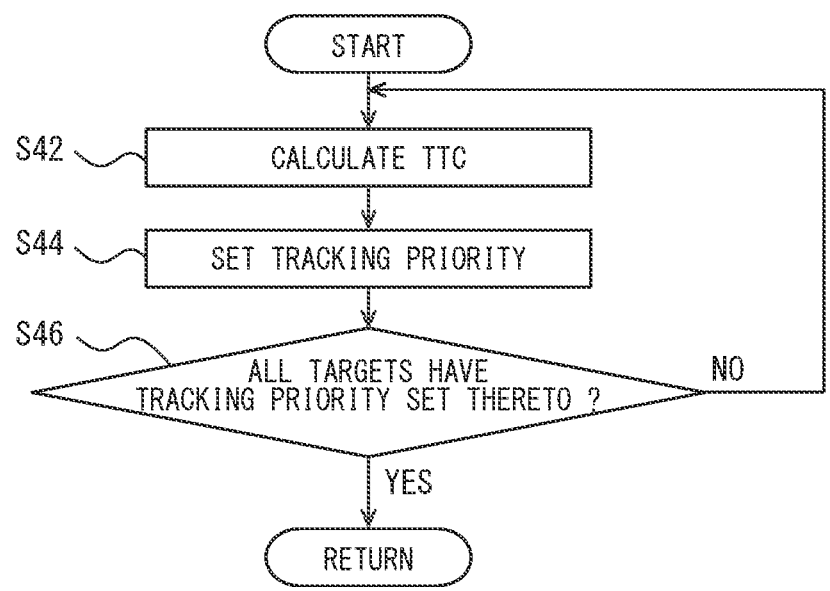
FIG. 9 is a flowchart of a tracking priority setting process.

As shown in FIG. 9, when the tracking priority setting process is started, the controller 60 calculates a collision margin time TTC (Time To Collision) of the target in S42 based on the relative speed and the distance to the target provisionally detected in S30. In this example, the collision margin time TTC is defined as time obtained/calculable by dividing the distance to the target by the relative speed. The relative speed is defined as having a positive value when the target is approaching the vehicle and has a negative value when the target is moving away from the vehicle. If the relative speed is zero, the collision margin time TTC is defined as having positive infinity.

In S44, the controller 60 assigns the tracking priority to the target based on the collision margin time TTC of the target. The assignment of the tracking priority can be performed based on a predetermined relationship between the tracking priority and the collision margin time TTC. For example, a tracking priority can be given to each target by using a priority setting table as shown in FIG. 10. The priority setting table is stored in advance in a ROM or the like of the controller 60.

Here, the assignment of the tracking priority using the priority setting table is described. As shown in FIG. 10, when the collision margin time TTC of the target is negative (TTC<0), that is, when the target is moving away from the vehicle, the tracking priority indicating that the decisive tracking is not required is given for such target. This is because it can be determined that a target moving away from the vehicle is not likely to collide with the vehicle.

Further, even when the collision margin time TTC of the target is positive, that is, even when the target is approaching the vehicle, when the collision margin time TTC is longer than a predetermined upper limit time T_max, a tracking priority that does not require the decisive tracking is given for such target. The upper limit time T_max is set in advance as a value of the collision margin time TTC that can be considered as long enough that does not necessitate to perform a warning process, a collision avoidance process, and the like. This is because, from the viewpoint of a warning process, a collision avoidance process, and the like, it can be determined that it is not necessary to proceed to be in the main tracking mode, for the detection of the relative speed or the like with high accuracy at the moment.

When the collision margin time TTC of the target is 0 or more and equal to or less than the upper limit time T_max, the tracking priority of the decisive tracking requirement is given to the target. Furthermore, for each target to which the tracking priority of decisive tracking is given, the shorer the collision margin time TTC is, the higher the priority value becomes, indicating that the target information should be detected for such target in high priority in the decisive tracking. The priority value can be represented by, for example, an integer of 1 or more. As to priority value, a smaller priority value may be defined to indicate a high priority of detection of the target information in the decisive tracking. In the present embodiment, the priority value is represented by an integer of 1 or more, and, the shorter the collision margin time TTC is, the priority of smaller value is given to the target, indicating that the target information should be detected in priority for such target.

In order to give such a tracking priority value, in the present embodiment, as shown in FIG. 10, a basic time T_ref and a resolution time Ta are used. The basic time T_ref is set in advance to, for example, a value equal to or longer than time required from the recognition of a danger of collision with the target in the in-vehicle system 1 to a start of a response process to the danger.

Specifically, in the in-vehicle system 1, the distance and the relative speed with respect to the target detected by the decisive tracking described later are acquired by the drive support ECU 100 together with the azimuth/direction of the target. The drive support ECU 100 determines whether or not there is a risk of collision with the target, based on the acquired distance, relative speed, azimuth/direction, and the like of the target. When determining that there is a danger, the drive support ECU 100 starts presenting warning information to an occupant by a display and/or a speaker, and/or starts control of a vehicle state by a brake system, a steering system, or the like in order to avoid a collision. The time from such a risk determination to the start of the response process depends on the configuration of the in-vehicle system 1. Therefore, the basic time T_ref is preset based on such time.

The resolution time Ta is preset as, for example, a value equal to or longer than time corresponding to the resolution of the collision margin time TTC calculated in S42. More specifically, since the collision margin time TTC is calculated using the distance and the relative speed provisionally detected by the provisional tracking in S30, the collision margin time TTC has an error corresponding to the detection error of the distance and the relative speed. The detection error of the distance and the relative speed may be caused by, for example, the mode of the transmission wave such as the irradiation time of the transmission wave, the hardware tolerance of the transmitter 20 and the receiver 40, the FFT process in the controller 60, and the like. Therefore, as the resolution time Ta, an error of the collision margin time TTC, that is, a value equal to or greater than the time resolution is used.

The priority value of the tracking priority is set as shown in FIG. 10 using the basic time T_ref, the resolution time Ta, and the collision margin time TTC. Specifically, when the collision margin time TTC is 0 or more and is shorter than the basic time T_ref, 1 indicating the highest priority is set as the priority value. When the collision margin time TTC is equal to or longer than the basic time T_ref and shorter than the sum of the basic time T_ref and the resolution time Ta, 2 indicating the second highest priority is set as the priority value. When the collision margin time TTC is equal to or more than the sum of the basic time T_ref and the resolution time Ta and is shorter than the sum of the basic time T_ref and twice the resolution time Ta, 3 indicating the third highest priority is set as the priority value. In such way, the priority value is set such that the priority value is incremented by 1 as the collision margin time TTC increases with each resolution time Ta.

In S46, the controller 60 determines whether or not the tracking priority has been given to all the targets detected by the scanning in S10. When the assignment of the tracking priority to all the targets is not complete, the process returns to S42, and the loop of S42 to S46 is repeated until the assignment of the tracking priority to all the targets is complete. When the assignment of the tracking priority to all the targets is complete, the process returns to the flow of FIG. 8 and S50 is performed.

<Explanation of Target Detection Process (Second Half)>

In S50, the controller 60 determines whether or not there are one or more targets to which the tracking priority of the decisive tracking is given. When there is one or more targets to which the tracking priority of the decisive tracking requirement is given, the process proceeds to S60. When there is no target to which the tracking priority of the decisive tracking requirement is present, the process returns to S10. The above-described S30, S40, and S50 constitute the above-mentioned provisional tracking mode.

In S60, the controller 60 sets a main tracking irradiation time for each target to which the tracking priority of decisive tracking is given, based on the priority value set in S40. Specifically, for a target having a smaller tracking priority value, a longer main tracking irradiation time is set. In setting the time, the controller 60 refers to, for example, a map or the like stored in a ROM or the like that predefines a relationship between each priority value and the corresponding main tracking irradiation time. The setting of the main tracking irradiation time based on such a priority value is performed in order to detect the relative speed with higher accuracy for a target having a higher tracking priority. Alternatively, in S60, the controller 60 may evenly set the main tracking irradiation time to the target to which the tracking priority of the decisive tracking is given based on the priority value set in S40. For example, the main tracking irradiation time corresponding to the smallest priority value among the priority values given to the plurality of targets in S40 may be set uniformly for the plurality of targets.

In S70, the controller 60 irradiates the transmission wave to each of the targets for the main tracking irradiation time set in S60 from the transmission antenna 28. Specifically, as shown in FIG. 7, the controller 60 sequentially transmits the transmission waves for the main tracking irradiation time set in S60 in the beam direction corresponding to the azimuth/direction of each of the targets requiring the decisive tracking from the transmission antenna 28. In the course of such transmission, the controller 60, for example, sequentially irradiates the transmission wave to each of the targets in a predetermined order, i.e., from the one close to one of the two radii defining the detection area (see FIG. 3) from the transmission antenna 28, which may be understood as an ascending order of the relative direction angle therefrom. Alternatively, the controller 60 may sequentially irradiate the target with the transmission waves from the transmission antenna 28 in an ascending order of the priority values. In such case, for a plurality of targets with the same tracking priority value, the transmission waves may sequentially be irradiated according to a preset rule, i.e., in an ascending order of the relative direction angle of the target with respect to one of the two radii defining the edge of the detection area. It should be noted that, when the transmission waves are irradiated to the targets for which the decisive tracking is required, a configuration may be adopted in which a plurality of targets are simultaneously radiated with the transmission waves whose beam directions are aligned to the azimuths/directions of these targets.

As a result, the controller 60 decisively detects the distance to and the relative speed of the target to which the tracking priority of the decisive tracking is given. The controller 60 stores the distance and the relative speed with respect to the target thus detected in the RAM for each target together with the azimuth/direction of the target detected in S10, and outputs them to the in-vehicle network to return to S10. The above-described S60 and S70 constitute the above-mentioned main tracking mode.

<Summary of First Embodiment>

The radar device 10 of the present embodiment includes a transmission antenna 28 that transmits a transmission wave, a reception antenna 42 that receives a reception wave, and a controller 60. The controller 60 transmits a transmission wave from the transmission antenna 28 in a plurality of transmission/reception modes, and causes the reception antenna 42 to receive the transmission wave reflected by the target as a reception wave, so that a target existing around the vehicle is detected, i.e., the controller 60 is configured to detect target information of a target. The plurality of transmission/reception modes include a scanning mode, a provisional tracking mode, and a main tracking mode.

In the scanning mode, beam scanning is performed in which the transmission wave is irradiated from the transmission antenna 28 in the detection angle range while changing the beam direction, and the presence of a target in the detection area and the azimuth of the target are at least detected.

In the provisional tracking mode, the target information is provisionally detected by irradiating the transmission wave to the target from the transmission antenna 28, for each of the targets detected in the scanning mode.

In the main tracking mode, the transmission wave irradiation time is set for each decisive target (each provisional target for which decisive tracking is required) based on the target information provisionally detected in the provisional tracking mode, and the transmission wave directed toward each target is irradiated from the transmission antenna 28 for the transmission wave irradiation time, for decisively detecting the target information for each decisive target. The decisive targets are also known as main targets. Note, even if there are multiple provisional targets, it might not be necessary to decisively track any of them in the main tracking mode.

In such a radar device 10, a provisional tracking mode for provisionally detecting the target information for each target is provided before a main tracking mode for main/decisive detection of the target information of the target. In the provisional tracking mode, the target information is provisionally detected by irradiating, from the transmission antenna 28, the transmission wave detected toward each target that has been detected in the scanning mode. In the main tracking mode, the transmission wave irradiation time is set based on the target information provisionally detected in the provisional tracking mode, and the transmission wave is irradiated toward the target from the transmission antenna 28 for the transmission wave irradiation time, thereby the target information is decisively detected for each target.

In such a configuration, the irradiation time of the transmission wave irradiated from the transmission antenna 28 for the main/decisive detection of the target information can be optimized based on a provisional detection result in the provisional tracking mode. Therefore, as shown in FIG. 11, compared with a comparative example in which all of the plurality of targets detected in the scanning mode are respectively irradiated with the transmission wave for a predetermined fixed time to detect the target information, the target information of the target is detectable (i.e., decisively detectable) in a shorter time. The fixed time in the above-described comparative example is an irradiation time that can ensure/guarantee a high detection accuracy of the target information, and corresponds to the main tracking irradiation time set when the priority value is 1 in the present embodiment.

Further, in the radar device 10 of the present embodiment, the controller 60 is configured to repeatedly perform the target detection process having the scanning mode, the provisional tracking mode, and the main tracking mode.

In such a configuration, the scanning mode, the provisional tracking mode, and the main tracking mode are repeatedly performed as one cycle of process for detecting the target information such as the relative speed, distance, and azimuth/direction of the target existing around the vehicle. That is, by providing the provisional tracking mode, the time required to perform one cycle of process is reducible. Therefore, according to the present embodiment, one cycle of process can be performed in a short/shorter cycle time. Therefore, the target information that is decisively detected in the main tracking mode is updatable in a short cycle, and the presence of a target that has newly invaded/entered into the detection area is quickly detectable in the scanning mode.

Further, in the radar device 10 of the present embodiment, the controller 60 is configured to perform a necessity determination of whether or not the target needs to be decisively tracked as a target in the main tracking mode, based on the provisional detection result in the provisional tracking mode. In the main tracking mode, the controller 60 is configured not to irradiate the target that has not been determined as a target in the main tracking mode with the transmission wave and not to perform the main/decisive detection of the target information of such target.

With such a configuration, the time required for the main tracking mode can be further shortened. That is, the time required to perform one cycle including the scanning mode, the provisional tracking mode, and the main tracking mode is further reducible.

Further, in the radar device 10 of the present embodiment, the controller 60 sets the tracking priority of the target based on the provisional detection result in the provisional tracking mode. In the main tracking mode, the controller 60 decisively detects the target information of the target(s) by irradiating the transmission wave to the target(s), for a longer transmission wave irradiation time for a higher tracking priority target or targets.

With such a configuration, when detecting the target information of (each of) a plurality of targets in the main tracking mode, a target having a high tracking priority among the plurality of targets is irradiated with a transmission wave for a longer irradiation time, and thus highly accurate target information is obtainable for such a target. On the other hand, the target information of a low tracking priority target can be detected in a short time by irradiating the target with a transmission wave for a short irradiation time. That is, in other words, while the main/decisive detection of the target information of high tracking priority target is performable with high accuracy, the time required for the main/decisive detection of the target information of a plurality of targets (i.e. required time for the main tracking mode) is reducible.

Note that decisive detection of the target information in contrast to provisional detection of the target information may also be designated as main detection in/throughout the specification.

In the first embodiment, as an example of the method of setting the tracking priority, a method of determining the tracking priority from the collision margin time TTC of the target has been described as illustrated in FIG. 10. However, this tracking priority setting method is an example and can be modified in various ways.

The controller 60 in the first modification of the first embodiment corrects the tracking priority determined from the collision margin time TTC illustrated in FIG. 10 to a higher tracking priority as the distance to the target becomes smaller.

For example, when the distance to the target is less than a first predetermined distance, the controller 60 corrects the tracking priority determined from the collision margin time TTC to a one-step higher tracking priority. This means that the priority value is corrected to a value lower by 1 from the viewpoint of the priority value. When the lower limit of the priority value is 1, and the corrected priority value is less than 1, the corrected priority value is set to 1.

When the distance to the target is equal to or greater than the first predetermined distance and less than a second predetermined distance, the controller 60 maintains the tracking priority determined from the collision margin time TTC. When the distance to the target is equal to or greater than the second predetermined distance, the controller 60 sets the tracking priority determined from the collision margin time TTC to a one-step lower tracking priority. This means that the priority value is corrected to a value higher by 1 from the viewpoint of the priority value. The first predetermined distance and the second predetermined distance can be determined in advance from the viewpoint that the higher the tracking priority is set for the target closer to the vehicle so that the target information of such target should be detected with high/higher accuracy.

The controller 60 sets the transmission wave irradiation time in the main tracking mode to a longer time as the tracking priority corrected by the distance to the target in the above-described way is higher.

Note that, in the tracking priority setting method of the first modification describe, the tracking priority used for setting the transmission wave irradiation time depends not only on the collision margin time TTC but also on the distance to the target. Among these dependencies, the dependency of the tracking priority on the collision margin time TTC is set such that the shorter the collision margin time TTC of the target is, the higher the tracking priority becomes.

The radar device 10 of the first modification sets the tracking priority in consideration of the distance in addition to the collision margin time TTC, for more suitably detecting the target information in the main tracking mode by an appropriate detection accuracy in comparison to the first embodiment, i.e., in a manner more appropriate for the situation.

For example, it is possible to set a high tracking priority for a target, among many targets having the same collision margin time TTC, at a shorter distance for the detection of the target information with high accuracy.

In addition, even in a situation where the collision margin time TTC of a target at a long distance from a subject vehicle is smaller than the collision margin time TTC of another target at a short distance from the subject vehicle, the tracking priority of the target at the short distance from the subject vehicle can appropriately be set to a higher value than the tracking priority of the target at the long distance from the subject vehicle.

In both of the methods described so far in the first embodiment and the first modification thereof, the controller 60 sets the tracking priority of the target based on the distance to the target and the relative speed included in the provisional detection result in the provisional tracking mode, which may be one example.

The method by which the controller 60 sets the tracking priority of the target based on the distance to the target and the relative speed thereof included in the provisional detection result in the provisional tracking mode is not limited to the above-described example.

For example, the following method can also be adopted.

The controller 60 may correct the tracking priority determined from the collision margin time TTC according to the relative speed of the target in place of/in addition to the correction based on the distance to the target. Even in such configuration, by adding the relative speed to the tracking priority setting in addition to the collision margin time TTC, the target information is more appropriately detectable, with an optimum accuracy, i.e., with an accuracy more appropriate for the situation, in comparison to the first embodiment.

For example, the tracking priority determined from the collision margin time TTC may be corrected to a higher tracking priority as the relative speed with respect to the target is smaller. In such configuration, among the plural targets having the same collision margin time TTC calculated based on the distance and the relative speed that are included in the provisional detection result in the provisional tracking mode, a target having a greater collision margin time TTC error, which may have been caused by distance detection error and/or relative speed detection error in the provisional tracking mode, can have its tracking priority corrected to a higher tracking priority value, thereby the target information of such target becomes detectable with higher accuracy in the main tracking mode. That is, for example, from among the targets having the same collision margin time TTC determined from the provisional detection result in the provisional tracking mode, a target or targets that may need to be handled in a warning process or in a collision avoidance process, i.e., a target or targets with greater collision margin time TTC error, become(s) detectable with higher accuracy in the main tracking mode. Note that, in such case, it is based on an assumption that the collision margin time TTC error may possibly be greater than the resolution time Ta described in the first embodiment. Further, among the errors (i.e., among the distance detection error and the relative speed detection error in the provisional tracking mode), the relative speed detection error is considered as a dominant factor for determining the collision margin time error, which is calculated by dividing distance by the relative speed. Whether it is a situation for correcting the tracking priority of the target may be identifiable based on (i) a magnitude of the distance detection error and a magnitude of the relative speed detection error in the provisional tracking mode and (ii) an assumption that typical detection ranges of the distance and the relative speed by the radar device 10 are known. The distance detection error (i.e., distance resolution) of the FCM method is identifiable based on the modulation bandwidth of the transmission wave. The relative speed detection error (i.e., relative speed resolution) of the FCM method is identifiable based on the transmission wave irradiation time, which may also be designated as an observation time, for detecting the target. A situation in which the collision margin time determined from the provisional detection result in the provisional tracking mode is corrected to a higher tracking priority for a target having a smaller relative speed may be, for example, that the distance detection error of the target in the provisional tracking mode is +/−1 m and the relative speed detection error of the target in the provisional tracking mode is +/−10×$10^3$ m/h. In such case, the two targets, i.e., a first target having provisionally detected distance and relative speed of 10 m and 20×$10^3$ m/h and a second target having provisionally detected distance and relative speed of 50 m and 100×$10^3$ m/h, respectively have the same collision margin time TTC calculated based on the above numbers, but the collision margin time TTC error of the first target having a lower relative speed is greater by several fold than the collision margin time TTC error of the second target having a higher relative speed.

In such tracking priority setting method, the tracking priority used to set the transmission wave irradiation time depends not only on the collision margin time TTC but also on the relative speed with respect to the target. Among these dependencies, the dependency of the tracking priority on the collision margin time TTC is such that the shorter the collision margin time TTC of the target is, the higher the tracking priority becomes.

(Second Modification of the First Embodiment)

The controller 60 may set the tracking priority of the target based on the type of the target in addition to the distance to the target and the relative speed thereof included in the provisional detection result in the provisional tracking mode.

According to such configuration, the tracking priority is set in consideration of the type of the target. Therefore, the target information of the pedestrian can be detectable with the accuracy more suitable to the situation. For example, the target information of a pedestrian can be detected with higher accuracy than the target information of the four-wheel vehicle or an automobile.

As an example of such a configuration, the controller 60 may correct the tracking priority determined from the collision margin time TTC according to the type of the target, in addition to/instead of the correction according to the distance to the target and/or the relative speed thereof. The type of the target triggering such a correction and how much the tracking priority of such target should be corrected may be set in advance.

For example, when the type of the target is a pedestrian or a bicycle, the controller 60 may correct the tracking priority of such target to a higher tracking priority. For example, the priority value may be corrected to a value lower by 1 than the present value. Such a correction scheme may be based on the viewpoint that pedestrians or bicycles are vulnerable to traffic accidents, so it is better to detect the target information of such target with high accuracy. Further, when the type of the target is the four-wheel vehicle or an automobile, the controller 60 may correct the tracking priority of such target to a lower tracking priority, as an implementation of the same correction scheme described above for the pedestrian/bicycle. For example, the priority value may be corrected to a value higher by 1 than the present value.

As the type of the target used for correcting the tracking priority, for example, a type of the target recognized by a camera ECU (not shown) based on the image around the vehicle captured by an in-vehicle camera (not shown) can be used.

(Third Modification of the First Embodiment)

In the first embodiment and the first modification thereof, the controller 60 sets the tracking priority of the target based on the distance and the relative speed included in the target information provisionally detected in the provisional tracking mode, and the transmission wave irradiation time in the main tracking mode is set based on the tracking priority.

Such a setting is an example of a configuration in which the controller 60 sets the transmission wave irradiation time in the main tracking mode based on the distance and the relative speed included in the target information provisionally detected in the provisional tracking mode.

The following configuration can also be adopted as another configuration for setting the transmission wave irradiation time in the main tracking mode based on the distance and the relative speed included in the target information provisionally detected in the provisional tracking mode.

The controller 60 may be configured to set the transmission wave irradiation time in the main tracking mode with reference to a map stored in a ROM or the like in which the transmission wave irradiation time determined from the distance to the target and the relative speed thereof is predetermined. Various maps can be adopted as such a map, among which a first map, a second map, and a third map are exemplified below.

The first map is a map in which the transmission wave irradiation time determined from the distance to the target and the relative speed thereof is predetermined so that the longer the transmission wave irradiation time is set as the collision margin time TTC of the target becomes shorter.

The second map is a map in which a predetermined relationship satisfying both of the following (A) and (B) is defined from the distance to the target and the relative speed thereof, i.e., (A) when the distance to the target is constant, the shorter the collision margin time TTC of the target is, the longer the transmission wave irradiation time is set, and (B) when the collision margin time TTC is constant, the shorter the distance to the target is, the longer the transmission wave irradiation time is set.

The third map is a map in which the transmission wave irradiation time is predetermined based on the distance and the relative speed of the target so that the transmission wave irradiation time determined based on the first map is further corrected to a longer time as the relative speed of the target is smaller.

Note that both of the second map and the third map define a predetermined relationship in which the transmission wave irradiation time depends on a parameter (i.e., a distance to the target or a relative speed of the target) in addition to depending on the collision margin time TTC. That is, they are respectively a map in which the transmission wave irradiation time determined from the distance to the target and the relative speed thereof is predefined.

In other words, in both of the second map and the third map in which the transmission wave irradiation time determined from the distance to the target and the relative speed thereof is predefined, the dependency of the transmission wave irradiation time on the collision margin time TTC is defined as the one in which the shorter the collision margin time TTC of the target is, the longer the transmission wave irradiation time is made.

From such a point of view, the first map and the third map are, respectively, a predetermined map in which the transmission wave irradiation time determined from the distance to the target and the relative speed thereof is longer as the collision margin time TTC of the target becomes shorter.

(Fourth Modification of the First Embodiment)

In the second modification, the controller 60 sets the tracking priority of a target based on the type of the target in addition to the distance and the relative speed thereof included in the target information provisionally detected in the provisional tracking mode, and the transmission wave irradiation time in the main tracking mode is set based on the tracking priority set in such manner.

Such a configuration is an example of setting the transmission wave irradiation time in the main tracking mode based on the type of the target in addition to the distance and the relative speed thereof included in the target information provisionally detected in the provisional tracking mode.

Various other configurations may also be adoptable for setting the transmission wave irradiation time in the main tracking mode based on the type of the target in addition to the distance and relative speed included in the target information provisionally detected in the provisional tracking mode.

For example, as shown in the third modification, the following configuration using a map can also be adopted.

The controller 60 may set the transmission wave irradiation time in the main tracking mode by referring to a map stored in a ROM or the like in which the transmission wave irradiation time is predefined from the distance to the target and the relative speed of the target as well as the type of the target.

In such a case, for example, if the distance to the target and the relative speed thereof are the same, the transmission wave irradiation time may be set as a longer time when the type of the target is a pedestrian than when the type of the target is a four-wheeled vehicle (i.e., an automobile).

(Fifth Modification 5 the First Embodiment)

In the first modification, the controller 60 determines the tracking priority from the collision margin time TTC calculated using the target information provisionally detected in the provisional tracking mode, and corrects the tracking priority according to the distance to the target and/or the relative speed thereof. The controller 60 sets the transmission wave irradiation time in the main tracking mode based on the corrected tracking priority.

On the other hand, the controller 60 in the fifth modification sets the transmission wave irradiation time in the main tracking mode based on (i) a tracking priority determined from the collision margin time TTC calculated using the target information provisionally detected in the provisional tracking mode and (ii) the distance to the target and/or the relative speed thereof provisionally detected in the provisional tracking mode.

According to such a configuration, in addition to the tracking priority as shown in the first embodiment, the distance to the target and/or the relative speed thereof is also taken into consideration to set the transmission wave irradiation time in the main tracking mode, which makes it possible to detect the target information in the main tracking mode with an accuracy more suitable to the situation, compared with the first embodiment.

The controller 60 in the fifth modification may be configured to refer to, for example, a map or the like that predefines the transmission wave irradiation time determined from (i) the tracking priority determined from the collision margin time TTC and (ii) the distance to the target and/or the relative speed thereof.

The map may define, for example, a longer transmission wave irradiation time as the distance to the target is smaller, at the same collision margin time TTC.

The map may define, for example, a longer transmission wave irradiation time as the relative speed decreases at the same collision margin time TTC.

(Sixth Modification of the First Embodiment)

The radar device 10 may be configured so that the various tracking priority setting methods illustrated in the first embodiment and the first and second modifications can be switched according to, for example, a user operation.

For example, the tracking priority setting method of the first embodiment may be called as a standard operation, the tracking priority setting method of the first modification may be called as a short-distance high-accuracy detection operation, and the tracking priority setting method in the second modification may be called as a high-accuracy pedestrian detection operation.

In such a case, the radar device 10 may be configured to switch the above-described three operations according to the user operation, for setting a tracking priority according to the user-selected operation, i.e., from among the standard operation, the short-distance high-accuracy detection operation, and the high-accuracy pedestrian detection operation.

Similarly, the radar device 10 may be configured to switch the various transmission wave irradiation time setting methods exemplified in the third and fourth modifications according to, for example, a user operation, and the transmission wave irradiation time may be set by an action specified by the user operation.

Figure 12:
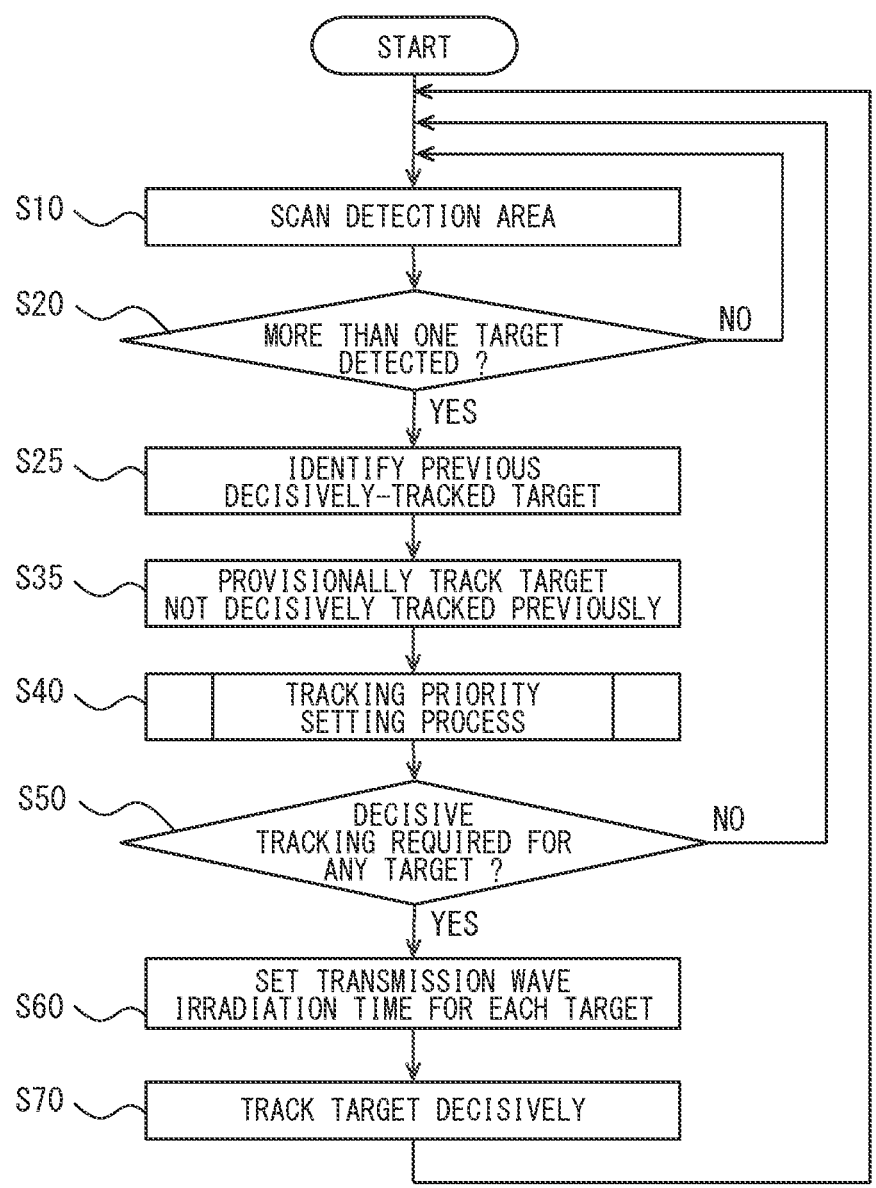
FIG. 12 is a flowchart of the target detection process according to a second embodiment.

Second Embodiment, FIG. 12

In the following, the description of the second embodiment is given focusing on the differences from the first embodiment.

The radar device 10 of the first embodiment provisionally detects the target information in the provisional tracking mode ("provisional detection") for all the targets detected in the scanning mode in each cycle of the target detection process that is repeatedly performed.

In contrast, in the radar device 10 of the second embodiment, among the targets detected in the scanning mode in each cycle of the target detection process, provisional detection of any target that was decisively detected in the main tracking mode of a previous cycle is omitted in the provisional tracking mode.

In other words, all main targets of a previous cycle are excluded from being provisional targets in the provisional tracking mode of a present cycle in the second embodiment.

In each cycle of the target detection process, based on the target information decisively detected in the main tracking mode in the previous cycle, the tracking priority is set for the target for which the provisional detection in the provisional tracking mode is omitted (i.e., for the target for which the target information is decisively detected in the main tracking mode in the previous cycle). In such manner, for the target once (i.e., previously) detected in the main tracking mode, provisional detection in the provisional tracking mode is omitted until such a target exits from the detection area or until such a target is given a tracking priority not requiring the main/decisive tracking.

Specifically, as shown in FIG. 12, in S25, the controller 60 determines whether or not each target detected in S10 of the current cycle is the target whose target information is decisively detected in S70 of the previous cycle (i.e., identifies a previous target). In such determination, the controller 60 refers to the azimuth/direction, relative speed, and distance of the target obtained in the previous cycle stored in the RAM. For example, match between (i) the azimuth/direction and distance of the target detected in S10 of the current cycle and (ii) the azimuth/direction and distance of the target predicted from the azimuth/direction, relative speed, and distance of the target stored in the RAM in the previous cycle at a timing of S10 of the current cycle is examined and determined.

In S35, the controller 60 irradiates the transmission wave to each target identified in S25 for which the target information has not been decisively detected in the previous cycle, and provisionally detects the target information. In other words, among the targets detected in S10 of the current cycle, provisional detection of the target information is omitted for each target for which the target information was decisively detected in S70 of the previous cycle.

In the tracking priority setting process of S40, the controller 60 sets the tracking priority based on the provisional detection result obtained in the current cycle for each target identified in S25 for which the target information is not decisively detected in the previous cycle, as in the first embodiment. On the other hand, for each target identified in S25 for which the target information has been decisively detected in the previous cycle, the tracking priority is set based on the target information that is decisively detected in the previous cycle. Subsequent processes S50 to S70 are the same as those in the first embodiment.

In the radar device 10 according to the second embodiment described above, when the controller 60 detects the target in the scanning mode while repeating the target detection process, the controller 60 identifies/determines whether the detected target is a previous target, i.e., a target for which the target information is decisively detected in the main tracking mode of the previous target detection process. The controller 60 omits the provisional detection of the target information in the provisional tracking mode of the current target detection process for the target whose target information is determined to have been decisively detected in the main tracking mode of the previous target detection process. Further, the controller 60 sets the transmission wave irradiation time to the target used in the main tracking mode of the current target detection process, based on the target information detected in the main tracking mode of the previous target detection process.

According to such a configuration, the time required for the provisional tracking mode is reducible, so that the target detection process can be performed in a short cycle.

Figure 13:
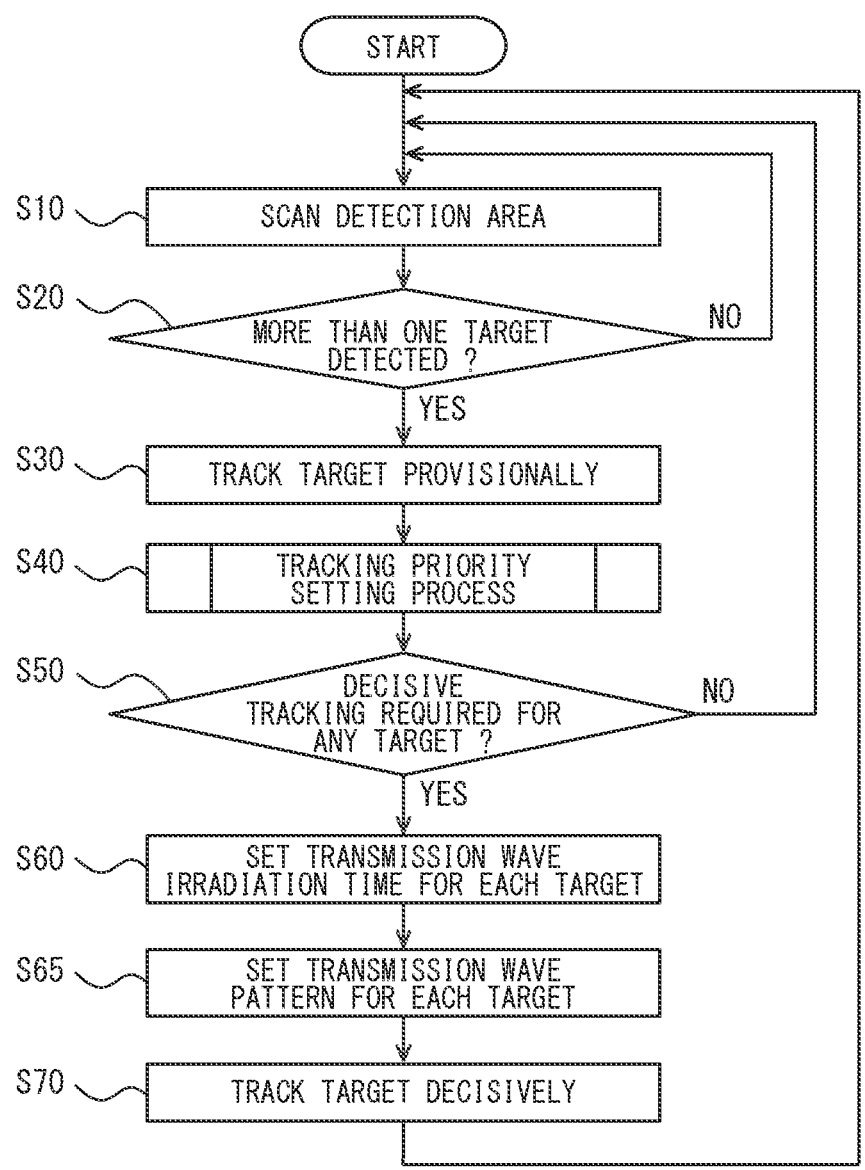
FIG. 13 is a flowchart of the target detection process according to a third embodiment.

Third Embodiment, FIG. 13

The third embodiment is described in the following. The description is focused on the differences from the first embodiment.

Figure 8:
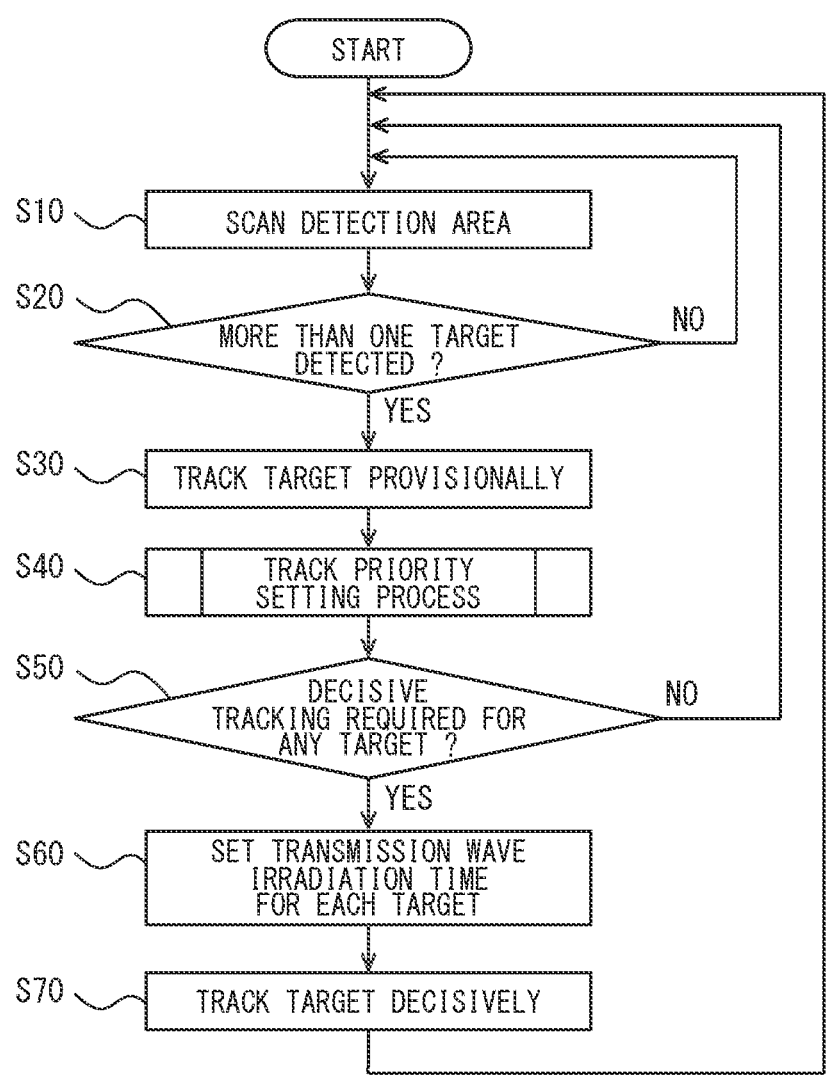
FIG. 8 is a flowchart of a target detection process according to the first embodiment.

The radar device 10 of the third embodiment performs the target detection process, having S65 for setting a transmission wave signal pattern of the transmission wave to be changeable as shown in FIG. 13 added to the target detection process of the first embodiment shown in FIG. 8. The transmission wave signal pattern of the transmission wave set in S65 is a transmission wave signal pattern of the transmission wave transmitted from the transmission antenna 28 when the target information is decisively detected in S70.

The configuration of the third embodiment pays attention to the fact that the ability to detect the relative speed of and distance to the target depends on the transmission wave signal pattern. The relative speed and distance detection capability mentioned here includes the maximum detection relative speed and the maximum detection distance in addition to the detection accuracy (resolution) of the relative speed and distance.

Figure 14:
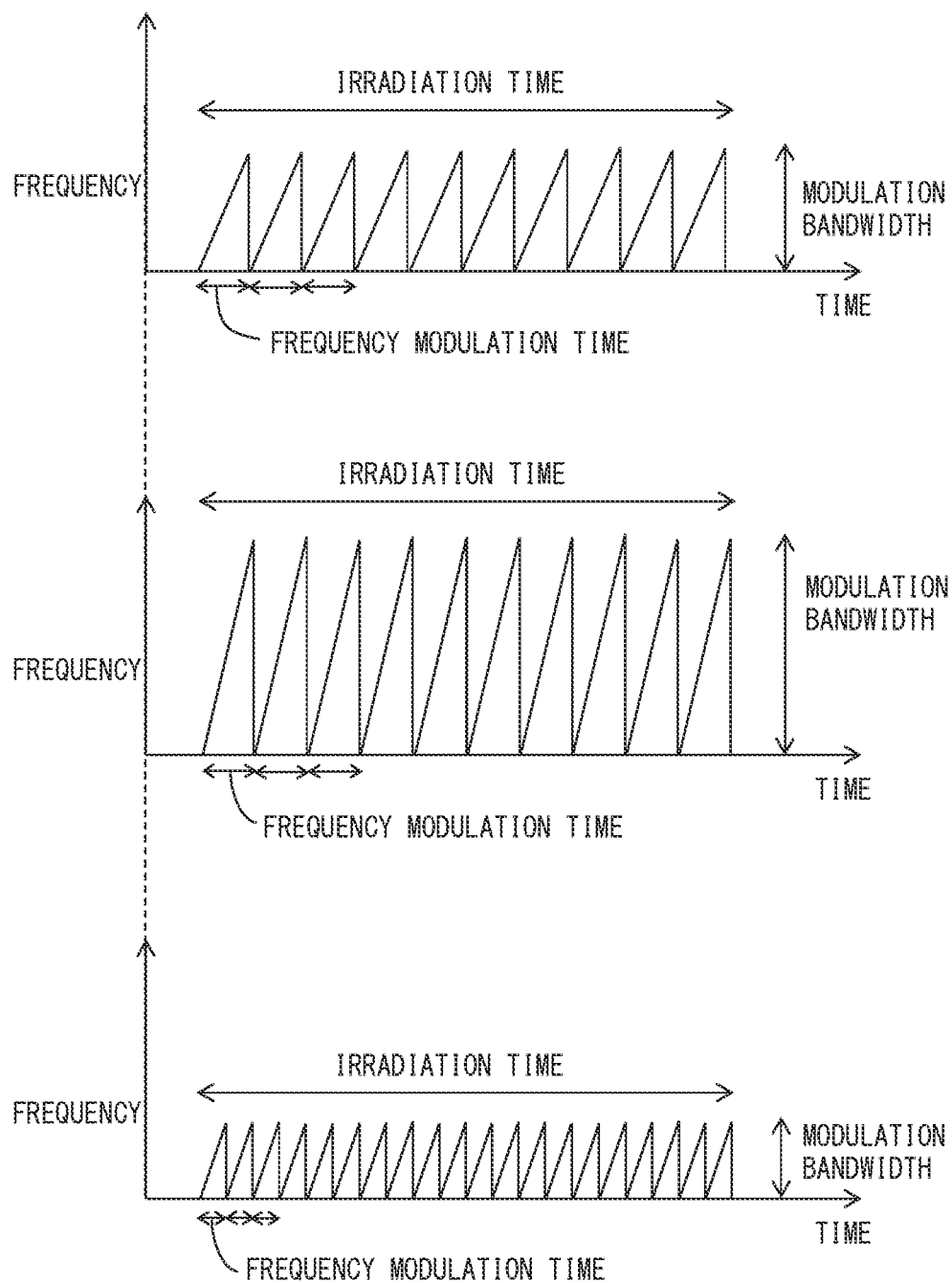
FIG. 14 is an explanatory diagram of a transmission wave signal pattern.

For example, comparing the three transmission wave signal patterns illustrated in FIG. 14, the transmission wave signal pattern illustrated in the middle row has a larger modulation bandwidth than the transmission wave signal pattern illustrated in the upper row. In the FCM method, typically, the larger the modulation bandwidth, the higher the distance detection accuracy (resolution). Therefore, the transmission wave signal pattern shown in the middle row of FIG. 14 is a transmission wave signal pattern with higher distance detection accuracy than the transmission wave signal pattern shown in the upper row.

The transmission wave signal pattern shown in the lower row of FIG. 14 is a transmission wave signal pattern with shorter frequency modulation time than the pattern in the upper low. In the FCM method, typically, the shorter the frequency modulation time is, the higher the maximum detection relative speed can be. Therefore, the transmission wave signal pattern shown in the lower row of FIG. 14 is a transmission wave signal pattern in which the maximum detection relative speed is larger than the transmission wave signal pattern shown in the upper row.

Returning to the description of the target detection process in FIG. 13 In S65, the controller 60 sets the transmission wave signal pattern for each target, for example, as follows.

The controller 60 sets, i.e., uses, the transmission wave signal pattern having the larger modulation bandwidth as the distance to the target is smaller (i.e., decreases) as the transmission wave signal pattern of the transmission wave with which the target is irradiated in S70. This is because, when the distance to the target is short, it is preferable to detect the distance with high accuracy from the viewpoint of a collision warning process, a collision avoidance process, and the like. When setting the transmission wave signal pattern to be changeable according to the distance to the target in such way, a map, for example, defining a relationship of a distance to the target and the transmission wave signal pattern corresponding thereto, or the like stored in a ROM or the like in advance may be referred to.

The distance to the target used in S65 may be the distance detected by the scanning of S10 or the provisional detection of S30, or, may also be the distance detected in the previous cycle when the target information of this target is decisively detected in S70 of the previous cycle.

Further, the controller 60 may set the transmission wave signal pattern in which the frequency modulation time is shorter as the subject vehicle speed is higher (i.e., increases), as the transmission wave signal pattern of the transmission wave irradiated to the target in S70. This is because, in a situation that the higher the speed of the subject vehicle is, the higher the relative speed between the target and the subject vehicle becomes, it may be preferable that the higher that speed of the subject vehicle is, the higher the maximum detection relative speed is set. When setting the transmission wave signal pattern to be changeable according to the vehicle speed in such way, the controller 60 may refer to a map or the like, which predefines a relationship between the vehicle speed and the transmission wave signal pattern corresponding thereto, for example, stored in the ROM or the like.

Although the above example of setting the frequency modulation time and the modulation bandwidth of the transmission wave signal pattern based on the target information has been described above, a phase of the transmission signal S may be set.

In the radar device 10 of the third embodiment described above, the controller 60 sets the transmission wave irradiation time of the transmission wave to be irradiated to the target in the main tracking mode based on the target information provisionally detected in the provisional tracking mode. In addition, the transmission wave signal pattern of the transmission wave irradiated to the target in the main tracking mode is set to be changeable for each target. In the main tracking mode, the controller 60 performs the main detection of the target information by irradiating the transmission wave of the set transmission wave signal pattern toward the target from the transmission antenna for the transmission wave irradiation time.

According to such a configuration, as compared with the case where a predetermined transmission wave signal pattern is uniformly used as the transmission wave signal pattern of the transmission wave irradiated to the target for the main detection, the detection capability of the target information in the main tracking mode can be suitably adapted to the situation.

Fourth Embodiment

In the following, the description of the fourth embodiment is given focusing on the differences from the first embodiment.

In the target detection process, the radar device 10 according to the first embodiment has a detection area determined in advance, and the detection angle range defining the detection area is beam-scanned in S10.

Figure 15:
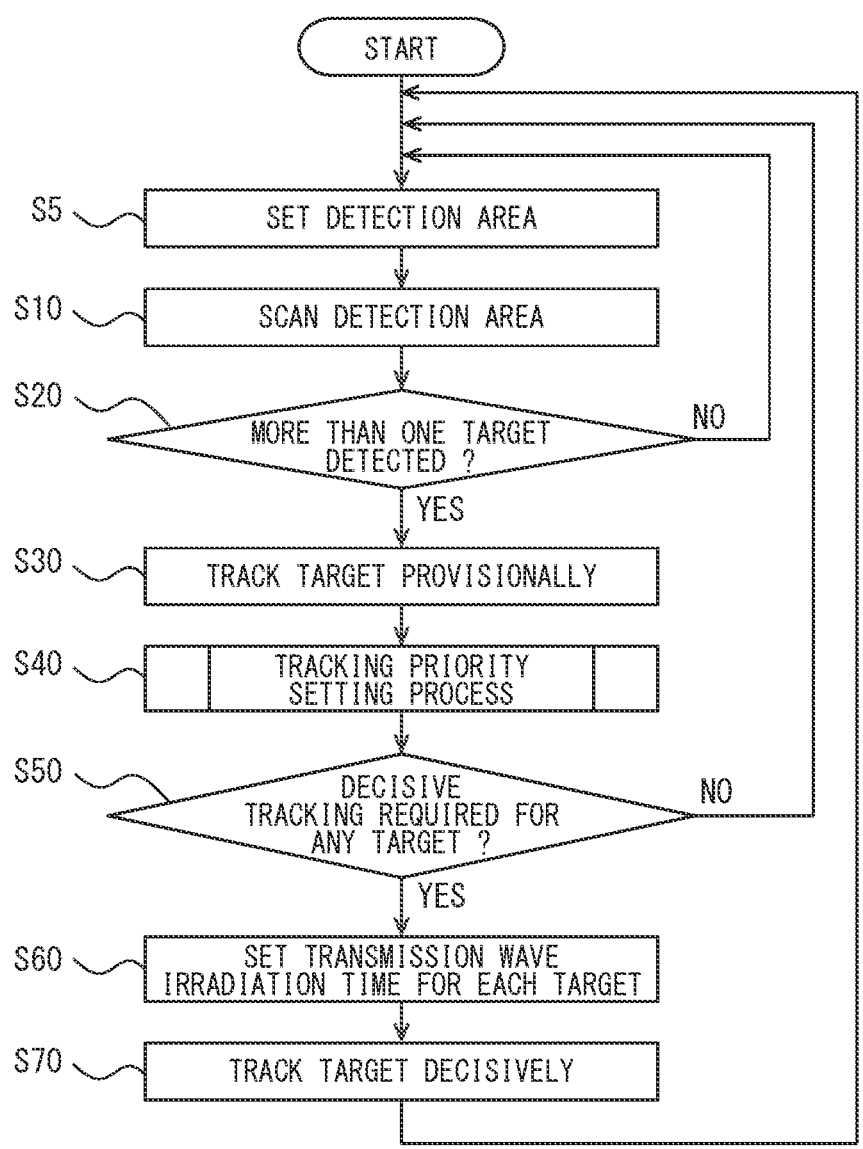
FIG. 15 is a flowchart of the target detection process according to a fourth embodiment.

On the other hand, in the radar device 10 of the fourth embodiment, in the target detection process, in S5 performed prior to S10 shown in FIG. 15, the detection area is set according to the vehicle speed of the vehicle in which the radar device 10 is mounted (referred to as subject vehicle). In S10, beam scanning is performed within the detection angle range that defines the detection area set in S5. In the process of S30 and subsequent steps, the target information is provisionally detected and then decisively detected for the target detected in the detection area set in S5.

Specifically, in S5, the controller 60 sets, as the detection area, an area in which a target that may collide with the subject vehicle may exist, which is a variable area according to the speed of the subject vehicle. The reason is that the radar device 10 of the present embodiment detects the distance, the relative speed, the azimuth/direction, and the like of the target used in the collision warning process or the collision avoidance process by the drive support ECU 100.

Figure 16:
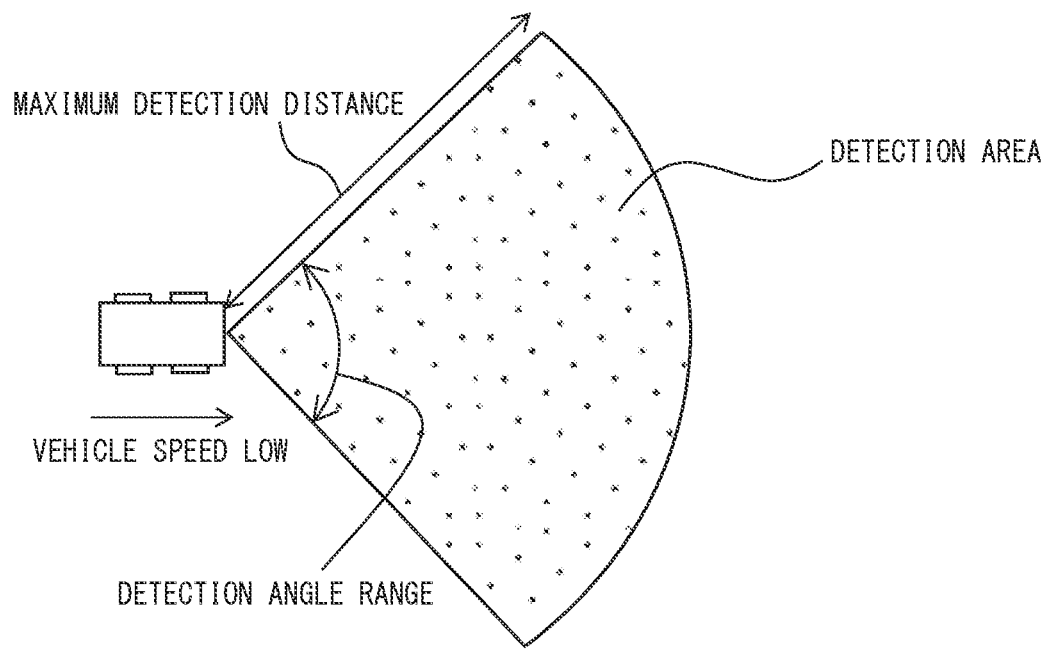
FIG. 16 is a diagram of an example of a detection area according to the fourth embodiment.
Figure 17:
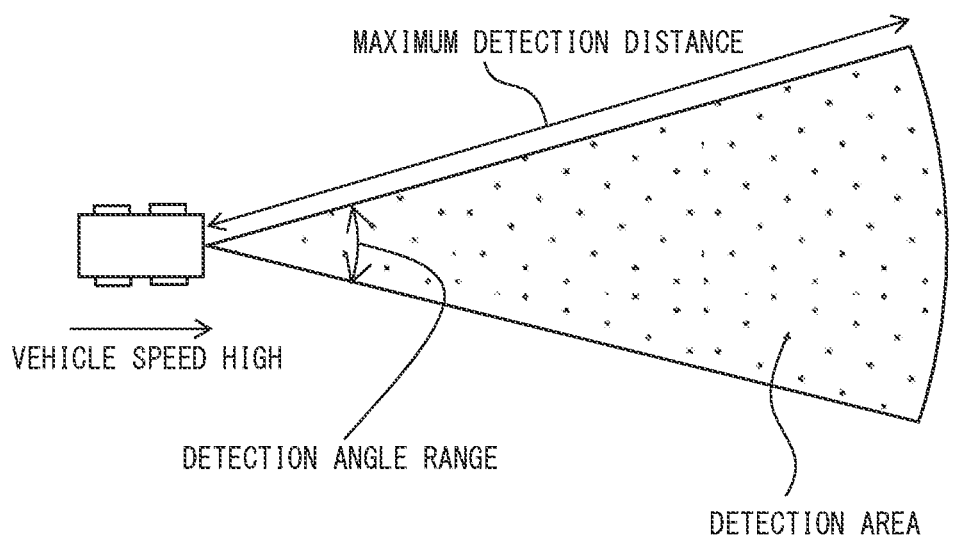
FIG. 17 is a diagram of another example of the detection area according to the fourth embodiment.

For example, as shown in FIGS. 16 and 17, of the maximum detection distance and the detection angle range that define the detection area, the maximum detection distance is set to increase as the vehicle speed increases. Assuming that, when the relative speed between the subject vehicle and the target is about the same speed as the subject vehicle, the area where the target that may collide with the subject vehicle can exist extends/stretches farther from the subject vehicle as the speed of the subject vehicle increases, the above-described setting is adopted.

As a specific example of such a maximum detection distance setting method, there is a method of setting the maximum detection distance in a distance range that is equal to or greater than a first distance and equal to or less than a second distance. The first distance is a distance obtained by the product of the vehicle speed and a basic time T_ref of the collision margin time TTC. The second distance is a distance obtained by the product of the vehicle speed and an upper limit time T_max of the collision margin time TTC.

The maximum detection distance can be increased by reducing the modulation bandwidth of the transmission signal S as described above. Therefore, the controller 60 may input to the transmission circuit 22 a transmission signal generation instruction instructing the generation of the FCM method transmission signal S having a smaller modulation bandwidth as the vehicle speed increases. In the course of inputting such an instruction, the controller 60 may refer to, for example, a map or the like stored in a ROM or the like in which transmission wave signal patterns corresponding to the respective vehicle speeds are defined in advance.

In general, the higher the vehicle speed is, the greater the change in the relative position with respect to the target per unit time can be. Here, the target detection process shown in FIG. 15 is a process that is repeatedly performed to detect the target information used for a collision warning process and the like. Therefore, in order to enable the target detection process to be performed in a shorter cycle as the speed of the subject vehicle increases, it is preferable to perform beam scanning over the detection angle range in such a manner that the scanning mode is complete in a shorter time as the speed of the subject vehicle increases.

Therefore, in S5, the detection angle range defining the detection area may be set to a narrower angle range as the speed of the subject vehicle increases. Instead of such setting, or in addition to such setting, the beam width and step angle of the transmission wave irradiated from the transmission antenna 28 in the scanning mode may be increased as the vehicle speed increases. Such a mode is also a mode in which the detection angle range is beam-scanned in a shorter time as the vehicle speed increases. The beam width can be adjusted by the controller 60 controlling the antenna element that irradiates an electromagnetic wave among the plurality of antenna elements that form the transmission antenna 28. The step angle can be controlled in the scanning mode by the controller 60 sequentially adjusting the beam direction instructed by the beam direction instruction input to the phase adjust circuit 26. It should be noted that the controller 60, when beam scanning the detection angle range in a shorter time as the vehicle speed increases, refers to a map or the like stored in a ROM or the like which defines in advance the relationship between the vehicle speed and the corresponding detection angle range, beam width, and step angle.

In the fourth embodiment described above, the controller 60 sets the maximum detection distance to be longer and performs beam scanning as the vehicle speed increases. With such a configuration, it is possible to increase the possibility that the target can be detected with sufficient time to avoid a collision with the subject vehicle even if the speed of the subject vehicle is increased.

Further, in the fourth embodiment, the controller 60 sets the detection angle range that defines the detection area to be narrower as the vehicle speed increases, and, in the scanning mode, performs beam scanning of the detection area defined by the set detection angle range. According to such a configuration, the time required for the scanning mode is reducible when the speed of the subject vehicle is high. Therefore, when the speed of the subject vehicle is high, the target detection process including the scanning mode, the provisional tracking mode, and the main tracking mode is repeatedly performable in a short cycle.

OTHER EMBODIMENTS

Although a plurality of embodiments have been exemplified above, the disclosed technology is not limited to the above-described embodiments, and the following modified examples are also included in the disclosed range. Further, the various modifications are also included in the scope of the disclosure as long as the modification does not depart from the gist thereof. In addition, a plurality of embodiments and modifications shown in the present specification can be combined and implemented unless otherwise described.

For example, in the above embodiment, the millimeter wave radar is illustrated as the radar device 10, but the radar device 10 may be configured to transmit and receive electromagnetic waves in a frequency band other than the millimeter wave to detect the target information. For example, the target may be detected by transmitting and receiving electromagnetic waves in the frequency band of light.

Although the FCM type radar device 10 is illustrated in the above embodiment, the radar device 10 is not limited to the FCM type. For example, the radar device 10 may be a system other than the FCM system, or the radar device 10 may use a plurality of systems such as FCM and FMCW (Frequency Modulated Continuous Wave).

In the above embodiment, although the configuration illustrated in FIG. 1 is shown as a configuration of the radar device 10 capable of controlling (i) the beam direction of the transmission wave of the transmission phased array antenna and (ii) the directivity (i.e., direction) of the reception phased array antenna, the configuration of the radar device 10 for such control of directions may be other configurations.

The controller 60 of the radar device 10 may be configured to perform the target detection process obtained by combining the target detection processes illustrated in the above-described embodiments. For example, the controller 60 of the radar device 10 may be configured to perform the target detection process in which S25 and S35 shown in FIG. 12 and S5 shown in FIG. 15 are added to the target detection process shown in FIG. 8.

In the controller 60 of the above-described embodiment, the CPU performs the target detection process, and the coprocessor as a dedicated circuit performs the FFT process. However, such a configuration is merely an example. For example, the CPU may perform the FFT process by executing a program stored in the ROM. In addition, the controller 60 may perform the target detection process using a dedicated circuit such as an IC. That is, various processes performed by the controller 60 may be performed by a CPU executing a program, may be performed by various combinations of the CPU executing a program and a dedicated circuit, or may be performed by a dedicated circuit. In addition, various processes performed by the controller 60 may be realized by distributed processes performed by a plurality of microcomputers or the like.

What is claimed is:

1. A radar device comprising:
a transmission antenna transmitting a transmission wave;
a reception antenna receiving a reception wave; and
a controller configured to control transmission/reception modes including:
(A) a scanning mode configured to detect scanned targets within a scanning area, each scanned target having a respective scanned target direction,
wherein the scanning mode sequentially irradiates in discrete steps by changing a beam direction by a step angle to scan the first scanning area;
(B) a provisional tracking mode configured to detect provisional targets by irradiating only in scanned target directions of the scanned targets,
wherein the first tracking mode determines a provisional distance and a provisional relative speed for each detected provisional target; and
(C) a non-provisional tracking mode configured to select non-provisional targets based on provisional information from the provisional tracking mode, and configured to decisively detect non-provisional target information for each non-provisional target by: (i) setting a transmission wave irradiation time and a transmission wave signal pattern for each non-provisional target based on respective associated provisional information from the provisional tracking mode, and (ii) irradiating each non-provisional target according to a respective set transmission wave irradiation time, wherein
the controller repeatedly performs a target detection process including: the scanning mode, the provisional tracking mode, and the non-provisional tracking mode,
the controller sets a tracking priority for each provisional target based on the provisional information, and
the controller decisively detects the non-provisional target information of each non-provisional target, in the non-provisional tracking mode, by using a variable non-provisional transmission wave irradiation time that is a function of the tracking priority, such that a non-provisional target with a first tracking priority has a greater irradiation time than a second target with a second tracking priority, the first tracking priority being higher than the second tracking priority.

2. The radar device according to claim 1, wherein
the controller performs, based on the provisional target information from the provisional tracking mode, a non-provisional detection necessity determination to determine whether each provisional target is respectively a non-provisional target in the non-provisional tracking mode, and
the controller irradiates, in the non-provisional tracking mode, no transmission wave to any provisional target that is not a non-provisional target.

3. The radar device according to claim 1, wherein
the controller sets the tracking priority of the target based on a distance to the target and a relative speed of the target that are included in a provisional detection result of the provisional tracking mode.

4. The radar device according to claim 3, wherein
the controller sets the tracking priority of the target based on a type of the target in addition to the distance to the target and the relative speed of the target that are included in the provisional detection result of the provisional tracking mode.

5. The radar device according to claim 1, wherein
the controller sets the transmission wave irradiation time for the target based on a distance to the target and a relative speed of the target that are included in the provisional detection result of the provisional tracking mode.

6. The radar device according to claim 5, wherein the controller sets the transmission wave irradiation time for the target based on a type of the target in addition to the distance to the target and the relative speed of the target that are included in the provisional detection result of the provisional tracking mode.

7. The radar device according to claim 1, wherein the controller calculates the collision margin time based on a distance to the target and a relative speed of the target that are included in the provisional detection result of the provisional tracking mode, and sets the tracking priority of the target from the collision margin time from the tracking priority of the target, and
the controller sets the transmission wave irradiation time for the target based on the tracking priority of the target and based also on the distance to the target and/or the relative speed of the target that are included in the provisional detection result of the provisional tracking mode.

8. The radar device according to claim 1, wherein the controller performs a present target detection process based at least partly upon previous information from an immediately previous target detection process, wherein the previous information includes identification of all previous non-provisional targets from the previous target detection process,
wherein the previous non-provisional targets are not scanned in a present provisional tracking mode, and
wherein the previous non-provisional targets are scanned in a present non-provisional tracking mode based upon the previous information.

9. The radar device according to claim 1, wherein the controller, in the non-provisional tracking mode, decisively detects decisive target information by (i) setting a transmission wave signal pattern of the transmission wave to be changeable and (ii) irradiating the transmission wave of the set transmission wave signal pattern for the set transmission wave irradiation time from the transmission antenna toward the target.

10. The radar device according to claim 1, wherein a maximum detection distance of the first scanning area is variable, such that the maximum detection distance increases when a vehicle speed increases.

11. The radar device according to claim 1, wherein a detection angle range of the first scanning area is variable, such that the detection angle range decreases when a vehicle speed increases.

12. A radar device comprising:
a transmitter;
a receiver; and
a controller configured to communicate with a drive support electronic control unit, and
wherein the controller is configured to perform a target detection process by sequentially performing: a scanning mode, a provisional tracking mode, and a non-provisional tracking mode;
wherein the scanning mode scans a scanning detection area by changing a scanning beam direction using increments of one step angle, such that provisional targets are detected and are associated with a respective provisional target direction,
wherein, the provisional tracking mode provisionally tracks the provisional targets based on the provisional target directions, and detects a provisional distance and a provisional relative speed for each provisional target,
wherein the non-provisional tracking mode selects non-provisional targets from among the provisional targets, tracks the non-provisional tracking targets based upon their respective provisional target directions, and determines a non-provisional distance and a non-provisional relative speed for each non-provisional target,
wherein the non-provisional tracking mode does not track any provisional target that is not selected as a non-provisional target,
wherein the controller sets a tracking priority for each provisional target based on the non-provisional distance and the non-provisional relative speed, and
wherein the controller decisively detects non-provisional target information of each non-provisional target, in the non-provisional tracking mode, by using a variable non-provisional transmission wave irradiation time that is a function of the tracking priority, such that a first target with a first tracking priority has a greater irradiation time than a second target with a second tracking priority, the first tracking priority being higher than the second tracking priority.

13. The radar device according to claim 12,
wherein the scanning mode uses a scanning irradiation time,
wherein the provisional tracking mode uses a provisional irradiation time that is greater than the scanning irradiation time,
wherein the non-provisional tracking mode uses a non-provisional irradiation time that is greater than the scanning irradiation time.

14. The radar device according to claim 12, wherein the non-provisional tracking mode includes a tracking priority setting process, and wherein the tracking priority setting process includes:
calculate a time-to-collision for each provisional target, based upon respective provisional distances and provisional relative speeds, and
decisively select the non-provisional targets based at least partly upon the time-to-collision for each provisional target.

15. The radar device according to claim 14, wherein the non-provisional tracking mode includes:
assign a respective tracking priority value to every provisional target having a time-to-collision that is within an inclusive range from 0 to a maximum value,
do not assign a respective priority value to every provisional target with a time-to-collision that is not within the inclusive range,
such that all of the provisional targets with time-to-collisions within the inclusive range are decisively selected as non-provisional targets and are non-provisional tracked.

16. The radar device according to claim 15, wherein:
a first provisional target has a first time-to-collision within the inclusive range and is assigned a first priority value,
a second provisional target has a second time-to-collision that is within the inclusive range and is greater than the first time-to-collision,
the first priority value is greater than the second priority value, and
a first non-provisional irradiation time for the first provisional target is greater than a second non-provisional irradiation time for the second provisional target.

17. The radar device according to claim 16, wherein:
a present target detection process includes a present scanning mode, a present provisional tracking mode, and a present non-provisional tracking mode;
a previous target detection process includes a previous scanning mode, a previous provisional tracking mode, and a previous non-provisional tracking mode;
the present provisional tracking mode excludes all non-provisional tracked targets from the previous non-provisional tracking mode;
the present non-provisional tracking mode tracks the non-provisional tracked targets from the previous non-provisional tracking mode using respective provisional directions from the previous provisional tracking mode.

18. The radar device according to claim 16,
wherein a selectable non-provisional transmission wave pattern is selected for each non-provisional target based at least partly upon the provisional distance and the provisional relative speed of each non-provisional target.

19. The radar device according to claim 12,
wherein the scanning detection area has a maximum detection distance and a detection angle range, and
wherein the maximum detection distance increases as a vehicle speed increases, and
wherein the detection angle range decreases as the vehicle speed increases.

20. The radar device according to claim 1, wherein
the controller irradiates for a provisional tracking irradiation time in the provisional tracking mode and irradiates for a non-provisional tracking wave irradiation time in the non-provisional tracking mode, and
the provisional tracking irradiation time is set to be shorter than the non-provisional tracking irradiation time.

21. The radar device according to claim 7, wherein
in the non-provisional tracking mode, the controller does not irradiate any target whose collision margin time is greater than a predetermined time.

* * * * *